United States Patent
Koponen et al.

(10) Patent No.: US 10,193,771 B2
(45) Date of Patent: Jan. 29, 2019

(54) DETECTING AND HANDLING ELEPHANT FLOWS

(71) Applicant: Nicira, Inc., Palo Alto, CA (US)

(72) Inventors: Teemu Koponen, San Francisco, CA (US); Justin Pettit, Los Altos Hills, CA (US); Martin Casado, Portola Valley, CA (US); Bruce Davie, Menlo Park, CA (US); W. Andrew Lambeth, San Mateo, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 14/231,647

(22) Filed: Mar. 31, 2014

(65) Prior Publication Data

US 2015/0163144 A1 Jun. 11, 2015

Related U.S. Application Data

(60) Provisional application No. 61/913,899, filed on Dec. 9, 2013.

(51) Int. Cl.
| | |
|---|---|
| *H04L 12/26* | (2006.01) |
| *H04L 12/801* | (2013.01) |
| *H04L 12/803* | (2013.01) |
| *H04L 12/947* | (2013.01) |
| *H04L 12/935* | (2013.01) |

(52) U.S. Cl.
CPC ............ *H04L 43/026* (2013.01); *H04L 43/16* (2013.01); *H04L 47/11* (2013.01); *H04L 47/125* (2013.01); *H04L 49/252* (2013.01); *H04L 49/3009* (2013.01); *H04L 49/3018* (2013.01)

(58) Field of Classification Search
None
See application file for complete search history.

(56) References Cited

U.S. PATENT DOCUMENTS

| | | |
|---|---|---|
| 5,224,100 A | 6/1993 | Lee et al. |
| 5,245,609 A | 9/1993 | Ofek et al. |
| 5,265,092 A | 11/1993 | Soloway et al. |

(Continued)

FOREIGN PATENT DOCUMENTS

| | | |
|---|---|---|
| EP | 1154601 | 11/2001 |
| JP | 2002-141905 | 5/2002 |

(Continued)

OTHER PUBLICATIONS

Portions of prosecution history of U.S. Appl. No. 14/231,652, Jul. 7, 2016, Pettit, Justin, et al.

(Continued)

*Primary Examiner* — Bunjob Jaroenchonwanit
(74) *Attorney, Agent, or Firm* — Adeli LLP

(57) ABSTRACT

Some embodiments provide a forwarding element that detects and handles elephant flows. In detecting, the forwarding element of some embodiments monitors statistics or measurements relating to a data flow. In handling, the forwarding element marks each packet associated with a detected elephant flow in some manner to differentiate it from a packet associated with a mouse flow. Alternatively, the forwarding element of break elephant flows into a number mouse flow by facilitating in sending packets associated with the detected elephant flow along different paths.

20 Claims, 13 Drawing Sheets

(56) References Cited

U.S. PATENT DOCUMENTS

| | | | |
|---|---|---|---|
| 5,504,921 A | 4/1996 | Dev et al. | |
| 5,550,816 A | 8/1996 | Hardwick et al. | |
| 5,668,810 A * | 9/1997 | Cannella, Jr. | 370/392 |
| 5,729,685 A | 3/1998 | Chatwani et al. | |
| 5,751,967 A | 5/1998 | Raab et al. | |
| 5,781,534 A | 7/1998 | Perlman et al. | |
| 6,104,699 A | 8/2000 | Holender et al. | |
| 6,104,700 A | 8/2000 | Haddock et al. | |
| 6,141,738 A | 10/2000 | Munter et al. | |
| 6,219,699 B1 | 4/2001 | McCloghrie et al. | |
| 6,430,160 B1 | 8/2002 | Smith et al. | |
| 6,456,624 B1 | 9/2002 | Eccles et al. | |
| 6,512,745 B1 | 1/2003 | Abe et al. | |
| 6,539,432 B1 | 3/2003 | Taguchi et al. | |
| 6,658,002 B1 | 12/2003 | Ross et al. | |
| 6,680,934 B1 | 1/2004 | Cain | |
| 6,721,334 B1 | 4/2004 | Ketcham | |
| 6,785,843 B1 | 8/2004 | McRae et al. | |
| 6,941,487 B1 | 9/2005 | Balakrishnan et al. | |
| 6,963,585 B1 | 11/2005 | Le Pennec et al. | |
| 6,999,454 B1 | 2/2006 | Crump | |
| 7,012,919 B1 * | 3/2006 | So et al. | 370/392 |
| 7,079,544 B2 | 7/2006 | Wakayama et al. | |
| 7,149,817 B2 * | 12/2006 | Pettey | 709/250 |
| 7,149,819 B2 * | 12/2006 | Pettey | 709/250 |
| 7,197,572 B2 | 3/2007 | Matters et al. | |
| 7,200,144 B2 | 4/2007 | Terrell et al. | |
| 7,209,439 B2 | 4/2007 | Rawlins et al. | |
| 7,283,473 B2 | 10/2007 | Arndt et al. | |
| 7,342,916 B2 | 3/2008 | Das et al. | |
| 7,362,752 B1 * | 4/2008 | Kastenholz | 370/389 |
| 7,370,120 B2 * | 5/2008 | Kirsch et al. | 709/246 |
| 7,391,771 B2 | 6/2008 | Orava et al. | |
| 7,450,598 B2 | 11/2008 | Chen et al. | |
| 7,463,579 B2 | 12/2008 | Lapuh et al. | |
| 7,478,173 B1 | 1/2009 | Delco | |
| 7,483,370 B1 | 1/2009 | Dayal et al. | |
| 7,533,176 B2 * | 5/2009 | Freimuth et al. | 709/227 |
| 7,555,002 B2 | 6/2009 | Arndt et al. | |
| 7,606,260 B2 | 10/2009 | Oguchi et al. | |
| 7,627,692 B2 | 12/2009 | Pessi | |
| 7,633,955 B1 | 12/2009 | Saraiya et al. | |
| 7,634,622 B1 * | 12/2009 | Musoll et al. | 711/151 |
| 7,640,353 B2 * | 12/2009 | Shen et al. | 709/231 |
| 7,643,488 B2 | 1/2010 | Khanna et al. | |
| 7,649,851 B2 | 1/2010 | Takashige et al. | |
| 7,706,266 B2 | 4/2010 | Plamondon | |
| 7,710,874 B2 | 5/2010 | Balakrishnan et al. | |
| 7,760,735 B1 | 7/2010 | Chen et al. | |
| 7,764,599 B2 | 7/2010 | Doi et al. | |
| 7,792,987 B1 | 9/2010 | Vohra et al. | |
| 7,802,000 B1 | 9/2010 | Huang et al. | |
| 7,808,919 B2 | 10/2010 | Nadeau et al. | |
| 7,808,929 B2 | 10/2010 | Wong et al. | |
| 7,818,452 B2 | 10/2010 | Matthews et al. | |
| 7,826,482 B1 | 11/2010 | Minei et al. | |
| 7,839,847 B2 | 11/2010 | Nadeau et al. | |
| 7,885,276 B1 | 2/2011 | Lin | |
| 7,936,770 B1 | 5/2011 | Frattura et al. | |
| 7,937,438 B1 | 5/2011 | Miller et al. | |
| 7,937,492 B1 | 5/2011 | Kompella et al. | |
| 7,940,763 B1 * | 5/2011 | Kastenholz | 370/389 |
| 7,948,986 B1 | 5/2011 | Ghosh et al. | |
| 7,953,865 B1 | 5/2011 | Miller et al. | |
| 7,991,859 B1 | 8/2011 | Miller et al. | |
| 7,995,483 B1 | 8/2011 | Bayar et al. | |
| 8,004,900 B2 * | 8/2011 | Dutta | G11C 11/5635 365/185.17 |
| 8,027,354 B1 | 9/2011 | Portolani et al. | |
| 8,031,606 B2 | 10/2011 | Memon et al. | |
| 8,031,633 B2 | 10/2011 | Bueno et al. | |
| 8,046,456 B1 | 10/2011 | Miller et al. | |
| 8,054,832 B1 | 11/2011 | Shukla et al. | |
| 8,055,789 B2 | 11/2011 | Richardson et al. | |
| 8,060,875 B1 | 11/2011 | Lambeth | |
| 8,131,852 B1 | 3/2012 | Miller et al. | |
| 8,149,737 B2 | 4/2012 | Metke et al. | |
| 8,155,028 B2 | 4/2012 | Abu-Hamdeh et al. | |
| 8,161,270 B1 | 4/2012 | Parker et al. | |
| 8,166,201 B2 | 4/2012 | Richardson et al. | |
| 8,199,750 B1 | 6/2012 | Schultz et al. | |
| 8,223,668 B2 | 7/2012 | Allan et al. | |
| 8,224,931 B1 | 7/2012 | Brandwine et al. | |
| 8,224,971 B1 | 7/2012 | Miller et al. | |
| 8,265,075 B2 | 9/2012 | Pandey | |
| 8,281,067 B2 | 10/2012 | Stolowitz | |
| 8,312,129 B1 | 11/2012 | Miller et al. | |
| 8,339,959 B1 | 12/2012 | Moisand et al. | |
| 8,339,994 B2 | 12/2012 | Gnanasekaran et al. | |
| 8,345,558 B2 | 1/2013 | Nicholson et al. | |
| 8,351,418 B2 | 1/2013 | Zhao et al. | |
| 8,355,328 B2 * | 1/2013 | Matthews | H04L 45/00 370/235 |
| 8,456,984 B2 | 6/2013 | Ranganathan et al. | |
| 8,504,718 B2 | 8/2013 | Wang et al. | |
| 8,571,031 B2 | 10/2013 | Davies et al. | |
| 8,611,351 B2 | 12/2013 | Gooch et al. | |
| 8,612,627 B1 | 12/2013 | Brandwine | |
| 8,619,731 B2 * | 12/2013 | Montemurro et al. | 370/338 |
| 8,625,594 B2 | 1/2014 | Safrai et al. | |
| 8,625,603 B1 | 1/2014 | Ramakrishnan et al. | |
| 8,625,616 B2 | 1/2014 | Vobbilisetty et al. | |
| 8,644,188 B1 | 2/2014 | Brandwine et al. | |
| 8,762,501 B2 | 6/2014 | Kempf et al. | |
| 8,819,259 B2 * | 8/2014 | Zuckerman et al. | 709/231 |
| 8,838,743 B2 | 9/2014 | Lewites et al. | |
| 8,976,814 B2 * | 3/2015 | Dipasquale | 370/474 |
| 9,032,095 B1 | 5/2015 | Traina et al. | |
| 9,762,507 B1 | 9/2017 | Gandham et al. | |
| 2001/0043614 A1 | 11/2001 | Viswanadham et al. | |
| 2002/0062422 A1 * | 5/2002 | Butterworth et al. | 711/114 |
| 2002/0093952 A1 | 7/2002 | Gonda | |
| 2002/0194369 A1 | 12/2002 | Rawlins et al. | |
| 2003/0041170 A1 | 2/2003 | Suzuki | |
| 2003/0058850 A1 | 3/2003 | Rangarajan et al. | |
| 2003/0063556 A1 * | 4/2003 | Hernandez | 370/208 |
| 2003/0093341 A1 * | 5/2003 | Millard et al. | 705/34 |
| 2003/0191841 A1 * | 10/2003 | DeFerranti et al. | 709/226 |
| 2004/0073659 A1 | 4/2004 | Rajsic et al. | |
| 2004/0098505 A1 | 5/2004 | Clemmensen | |
| 2004/0186914 A1 | 9/2004 | Shimada | |
| 2004/0264472 A1 * | 12/2004 | Oliver et al. | 370/395.4 |
| 2004/0267866 A1 | 12/2004 | Carollo et al. | |
| 2004/0267897 A1 | 12/2004 | Hill et al. | |
| 2005/0018669 A1 | 1/2005 | Arndt et al. | |
| 2005/0027881 A1 | 2/2005 | Figueira et al. | |
| 2005/0053079 A1 | 3/2005 | Havala | |
| 2005/0083953 A1 | 4/2005 | May | |
| 2005/0111445 A1 | 5/2005 | Wybenga et al. | |
| 2005/0120160 A1 | 6/2005 | Plouffe et al. | |
| 2005/0132044 A1 | 6/2005 | Guingo et al. | |
| 2005/0182853 A1 | 8/2005 | Lewites et al. | |
| 2005/0220096 A1 | 10/2005 | Friskney et al. | |
| 2005/0232230 A1 | 10/2005 | Nagami et al. | |
| 2006/0002370 A1 | 1/2006 | Rabie et al. | |
| 2006/0026225 A1 | 2/2006 | Canali et al. | |
| 2006/0028999 A1 | 2/2006 | Iakobashvili et al. | |
| 2006/0029056 A1 | 2/2006 | Perera et al. | |
| 2006/0037075 A1 | 2/2006 | Frattura et al. | |
| 2006/0104286 A1 * | 5/2006 | Cheriton | 370/395.32 |
| 2006/0140118 A1 * | 6/2006 | Alicherry et al. | 370/235 |
| 2006/0174087 A1 | 8/2006 | Hashimoto et al. | |
| 2006/0187908 A1 | 8/2006 | Shimozono et al. | |
| 2006/0193266 A1 | 8/2006 | Siddha et al. | |
| 2006/0206655 A1 | 9/2006 | Chappell et al. | |
| 2006/0221961 A1 | 10/2006 | Basso et al. | |
| 2006/0246900 A1 * | 11/2006 | Zheng | 455/435.3 |
| 2006/0262778 A1 | 11/2006 | Haumont et al. | |
| 2006/0282895 A1 | 12/2006 | Rentzis et al. | |
| 2006/0291388 A1 | 12/2006 | Amdahl et al. | |
| 2007/0050763 A1 | 3/2007 | Kagan et al. | |
| 2007/0055789 A1 | 3/2007 | Claise et al. | |
| 2007/0064673 A1 | 3/2007 | Bhandaru et al. | |
| 2007/0156919 A1 | 7/2007 | Potti et al. | |

(56) References Cited

U.S. PATENT DOCUMENTS

| | | | |
|---|---|---|---|
| 2007/0258382 A1* | 11/2007 | Foll et al. | 370/252 |
| 2007/0260721 A1 | 11/2007 | Bose et al. | |
| 2007/0283412 A1 | 12/2007 | Lie et al. | |
| 2007/0286185 A1 | 12/2007 | Eriksson et al. | |
| 2007/0297428 A1 | 12/2007 | Bose et al. | |
| 2008/0002579 A1 | 1/2008 | Lindholm et al. | |
| 2008/0002683 A1 | 1/2008 | Droux et al. | |
| 2008/0049614 A1 | 2/2008 | Briscoe et al. | |
| 2008/0049621 A1 | 2/2008 | McGuire et al. | |
| 2008/0049786 A1 | 2/2008 | Ram et al. | |
| 2008/0059556 A1 | 3/2008 | Greenspan et al. | |
| 2008/0071900 A1 | 3/2008 | Hecker et al. | |
| 2008/0086726 A1 | 4/2008 | Griffith et al. | |
| 2008/0159301 A1 | 7/2008 | de Heer | |
| 2008/0240095 A1 | 10/2008 | Basturk | |
| 2009/0006607 A1* | 1/2009 | Bu et al. | 709/224 |
| 2009/0010254 A1 | 1/2009 | Shimada | |
| 2009/0046581 A1 | 2/2009 | Eswaran et al. | |
| 2009/0150527 A1 | 6/2009 | Tripathi et al. | |
| 2009/0292858 A1 | 11/2009 | Lambeth et al. | |
| 2010/0128623 A1 | 5/2010 | Dunn et al. | |
| 2010/0131636 A1 | 5/2010 | Suri et al. | |
| 2010/0214949 A1 | 8/2010 | Smith et al. | |
| 2010/0232435 A1 | 9/2010 | Jabr et al. | |
| 2010/0254385 A1 | 10/2010 | Sharma et al. | |
| 2010/0257263 A1 | 10/2010 | Casado et al. | |
| 2010/0275199 A1 | 10/2010 | Smith et al. | |
| 2010/0306408 A1 | 12/2010 | Greenberg et al. | |
| 2011/0022695 A1 | 1/2011 | Dalal et al. | |
| 2011/0075664 A1 | 3/2011 | Lambeth et al. | |
| 2011/0085461 A1* | 4/2011 | Liu et al. | 370/252 |
| 2011/0085557 A1 | 4/2011 | Gnanasekaran et al. | |
| 2011/0085559 A1 | 4/2011 | Chung et al. | |
| 2011/0085563 A1 | 4/2011 | Kotha et al. | |
| 2011/0128959 A1 | 6/2011 | Bando et al. | |
| 2011/0164503 A1* | 7/2011 | Yong et al. | 370/237 |
| 2011/0194567 A1 | 8/2011 | Shen | |
| 2011/0202920 A1 | 8/2011 | Takase | |
| 2011/0249970 A1 | 10/2011 | Eddleston et al. | |
| 2011/0261825 A1 | 10/2011 | Ichino | |
| 2011/0299413 A1 | 12/2011 | Chatwani et al. | |
| 2011/0299534 A1 | 12/2011 | Koganti et al. | |
| 2011/0299537 A1 | 12/2011 | Saraiya et al. | |
| 2011/0305167 A1 | 12/2011 | Koide | |
| 2011/0317559 A1 | 12/2011 | Kern et al. | |
| 2011/0317696 A1 | 12/2011 | Aldrin et al. | |
| 2012/0054367 A1 | 3/2012 | Ramakrishnan et al. | |
| 2012/0079478 A1 | 3/2012 | Galles et al. | |
| 2012/0131222 A1* | 5/2012 | Curtis et al. | 709/235 |
| 2012/0159454 A1 | 6/2012 | Barham et al. | |
| 2012/0182992 A1 | 7/2012 | Cowart et al. | |
| 2012/0243539 A1* | 9/2012 | Keesara | 370/392 |
| 2012/0287791 A1* | 11/2012 | Xi | H04L 43/0882 370/237 |
| 2013/0024579 A1 | 1/2013 | Zhang et al. | |
| 2013/0054761 A1 | 2/2013 | Kempf et al. | |
| 2013/0058346 A1 | 3/2013 | Sridharan et al. | |
| 2013/0064088 A1 | 3/2013 | Yu et al. | |
| 2013/0067067 A1 | 3/2013 | Miri et al. | |
| 2013/0163427 A1 | 6/2013 | Beliveau et al. | |
| 2013/0163475 A1 | 6/2013 | Beliveau et al. | |
| 2013/0286846 A1* | 10/2013 | Atlas et al. | 370/236 |
| 2013/0287026 A1 | 10/2013 | Davie | |
| 2013/0322248 A1* | 12/2013 | Guo | 370/235 |
| 2013/0332602 A1 | 12/2013 | Nakil et al. | |
| 2013/0339544 A1 | 12/2013 | Mithyantha | |
| 2014/0019639 A1 | 1/2014 | Ueno | |
| 2014/0029451 A1 | 1/2014 | Nguyen | |
| 2014/0108738 A1 | 4/2014 | Kim et al. | |
| 2014/0115578 A1 | 4/2014 | Cooper et al. | |
| 2014/0119203 A1 | 5/2014 | Sundaram et al. | |
| 2014/0173018 A1 | 6/2014 | Westphal et al. | |
| 2014/0195666 A1 | 7/2014 | Dumitriu et al. | |
| 2014/0233421 A1* | 8/2014 | Matthews | 370/253 |
| 2014/0281030 A1 | 9/2014 | Cui et al. | |
| 2014/0372616 A1* | 12/2014 | Arisoylu et al. | 709/226 |
| 2015/0016255 A1 | 1/2015 | Bisht et al. | |
| 2015/0071072 A1* | 3/2015 | Ratzin | H04L 47/11 370/235 |
| 2015/0106804 A1 | 4/2015 | Chandrashekhar et al. | |
| 2015/0120959 A1 | 4/2015 | Bennett et al. | |
| 2015/0124825 A1 | 5/2015 | Dharmapurikar et al. | |
| 2015/0163117 A1 | 6/2015 | Lambeth et al. | |
| 2015/0163142 A1 | 6/2015 | Pettit et al. | |
| 2015/0163145 A1 | 6/2015 | Pettit et al. | |
| 2015/0163146 A1* | 6/2015 | Zhang et al. | H04L 47/125 |
| 2015/0172075 A1 | 6/2015 | DeCusatis et al. | |
| 2015/0180769 A1* | 6/2015 | Wang et al. | H04L 45/586 |
| 2015/0237097 A1 | 8/2015 | Devireddy et al. | |

FOREIGN PATENT DOCUMENTS

| | | |
|---|---|---|
| JP | 2003-069609 | 3/2003 |
| JP | 2003-124976 | 4/2003 |
| JP | 2003-318949 | 11/2003 |
| WO | WO 95/06989 | 3/1995 |
| WO | WO 2004/047377 | 6/2004 |
| WO | WO 2012/126488 | 9/2012 |
| WO | WO 2013/184846 | 12/2013 |

OTHER PUBLICATIONS

Portions of prosecution history U.S. Appl. No. 14/231,654, Mar. 14, 2016, Pettit, Justin, et al.

Portions of prosecution history of U.S. Appl. No. 14/502,102, May 16, 2016, Lambeth, W. Andrew, et al.

Anwer, Muhammad Bilal, et al., "Building a Fast, Virtualized Data Plane with Programmable Hardware," Aug. 17, 2009, pp. 1-8, VISA'09, ACM Barcelona, Spain.

Author Unknown, "Open vSwitch, An Open Virtual Switch," Dec. 30, 2010, 2 pages.

Author Unknown, "OpenFlow Switch Specification, Version 0.9.0 (Wire Protocol 0x98)," Jul. 20, 2009, pp. 1-36, Open Networking Foundation.

Author Unknown, "OpenFlow Switch Specification, Version 1.0.0 (Wire Protocol 0x01)," Dec. 31, 2009, pp. 1-42, Open Networking Foundation.

Author Unknown, "OpenFlow Switch Specification, Version 1.1.0 Implemented (Wire Protoco 0x02)," Feb. 28, 2011, pp. 1-56, Open Networking Foundation.

Casado, Martin, et al. "Ethane: Taking Control of the Enterprise," SIGCOMM'07, Aug. 27-31, 2007, pp. 1-12, ACM, Kyoto, Japan.

Curtis, Andrew R., et al., "DevoFlow: Scaling Flow Management for High-Performance Networks," Aug. 15, 2011, pp. 254-265, SIGCOMM, ACM.

Das, Saurav, et al. "Simple Unified Control for Packet and Circuit Networks," Month Unknown, 2009, pp. 147-148, IEEE.

Das, Saurav, et al., "Unifying Packet and Circuit Switched Networks with OpenFlow," Dec. 7, 2009, 10 pages.

Fernandes, Natalia C., et al., "Virtual networks:isolation, performance, and trends," Oct. 7, 2010, 17 pages, Institut Telecom and Springer-Verlag.

Foster, Nate, et al., "Frenetic: A Network Programming Language," ICFP '11, Sep. 19-21, 2011, 13 pages, Tokyo, Japan.

Greenhalgh, Adam, et al., "Flow Processing and the Rise of Commodity Network Hardware," ACM SIGCOMM Computer Communication Review, Apr. 2009, pp. 21-26, vol. 39, No. 2.

Gude, Natasha, et al., "NOX: Towards an Operating System for Networks," Jul. 2008, pp. 105-110, vol. 38, No. 3, ACM SIGCOMM Computer communication Review.

Hinrichs, Timothy L., et al., "Practical Declarative Network Management," WREN'09, Aug. 21, 2009, pp. 1-10, Barcelona, Spain.

Koponen, Teemu, et al., "Network Virtualization in Multi-tenant Datacenters," Aug. 2013, pp. 1-22, VMware, Inc., Palo Alto, California, USA.

Koponen, Teemu, et al., "Onix: A Distributed Control Platform for Large-scale Production Networks," In Proc. OSDI, Oct. 2010, pp. 1-14.

(56) References Cited

OTHER PUBLICATIONS

Loo, Boon Thau, et al., "Declarative Routing: Extensible Routing with Declarative Queries," In Proc. of SIGCOMM, Aug. 21-26, 2005, 12 pages, Philadelphia, PA, USA.

Loo, Boon Thau, et al., "Implementing Declarative Overlays," In Proc. of SOSP, Oct. 2005, 16 pages, Brighton, United Kingdom.

Matsumoto, Nobutaka, et al., "LightFlow: Speeding Up GPU-based Flow Switching and Facilitating Maintenance of Flow Table," 2012 IEEE 13$^{th}$ International Conference on High Performance Switching and Routing, Jun. 24, 2012, pp. 76-81, IEEE.

McKeown, Nick, et al., "OpenFlow: Enabling Innovation in Campus Networks," ACS SIGCOMM Computer communication Review, Apr. 2008, pp. 69-74, vol. 38, No. 2.

Nygren, Anders, et al., OpenFlow Switch Specification, Version 1.3.4 (Protocol version 0x04), Mar. 27, 2014, pp. 1-84, Open Networking Foundation. (Part 1 of 2).

Nygren, Anders, et al., OpenFlow Switch Specification, Version 1.3.4 (Protocol version 0x04), Mar. 27, 2014, pp. 85-171, Open Networking Foundation. (Part 2 of 2).

Pettit, Justin, et al., "Virtual Switching in an Era of Advanced Edges," Sep., 2010, 7 pages.

Pfaff, B., et al., "The Open vSwitch Database Management Protocol," draft-pfaff-ovsdb-proto-00, Aug. 20, 2012, pp. 1-34, Nicira, Inc., Palo Alto, California, USA.

Pfaff, Ben, et al., "OpenFlow Switch Specification," Sep. 6, 2012, 128 paegs, The Open Networking Foundation.

Pfaff, Ben., et al., "Extending Networking into the Virtualization Layer," Proc. of HotNets, Oct. 2009, pp. 1-6.

Phaal, Peter, et al., "sFlow Version 5," Jul. 2004, 46 pages, sFlow.org.

Phan, Doantam, et al., "Visual Analysis of Network Flow Data with Timelines and Event Plots," month unknown, 2007, pp. 1-16, VizSEC.

Popa, Lucian, et al., "Building Extensible Networks with Rule-Based Forwarding," In USENIX OSDI, Month Unknown, 2010, pp. 1-14.

Sherwood, Rob, et al., "Carving Research Slices Out of Your Production Networks with OpenFlow," ACM SIGCOMM Computer Communications Review, Jan. 2010, pp. 129-130, vol. 40, No. 1.

Sherwood, Rob, et al., "FlowVisor: A Network Virtualization Layer," Oct. 14, 2009, pp. 1-14, OPENFLOW-TR-2009-1.

Tavakoli, Arsalan, et al., "Applying NOX to the Datacenter," month unknown, 2009, 6 pages, Proceedings of HotNets.

Yu, Minlan, et al., "Scalable Flow-Based Networking with DIFANE," Aug. 2010, pp. 1-16, In Proceedings of SIGCOMM.

\* cited by examiner

DETECTING AND HANDLING ELEPHANT FLOWS

CLAIM OF BENEFIT TO PRIOR APPLICATIONS

This application claims the benefit of U.S. Provisional Patent Application 61/913,899, entitled "Detecting and Handling Elephant Flows", filed on Dec. 9, 2013. U.S. Provisional Patent Application 61/913,899 is incorporated herein by reference.

BACKGROUND

Today, a datacenter may process different types of flows, including elephant flows and mouse flows. An elephant flow represents a long-lived flow or a continuous traffic flow that is typically associated with high volume connection. Different from an elephant flow, a mouse flow represents a short-lived flow. Mice are often associated with bursty, latency-sensitive applications, whereas elephants tend to be associated with large data transfers in which throughput is far more important than latency.

A problem with elephant flows is that they tend to fill network buffers end-to-end, and this introduces non-trivial queuing delay to anything that shares these buffers. For instance, a forwarding element may be responsible for managing several queues to forward packets, and several packets belonging to a mouse flow may be stuck in the same queue behind a group of other packets belonging to an elephant flow. In a network of elephants and mice, this means that the more latency-sensitive mice are being affected. Another problem is that mice are generally very bursty, so adaptive routing techniques are not effective with them.

BRIEF SUMMARY

Embodiments described herein provide a forwarding element that detects and handles elephant flows. In detecting, the forwarding element of some embodiments monitors statistics or measurements relating to a data flow. As an example, the forwarding element may track the number of bytes sent in the data flow, and specify, based on the number of bytes, whether the data flow should be classified as elephant flow. In some embodiments, the forwarding element performs the monitoring on a per data flow basis by tracking statistics associated with a flow entry (e.g., in a flow table) that is used to process packets.

In some embodiments, the forwarding element is an edge forwarding element. The edge forwarding element is in a unique position to monitor data flows because it represents a last forwarding element before one or more end machine. For instance, the edge forwarding element may be communicatively coupled to a particular machine. The forwarding element can then detect an elephant flow by directly monitoring outbound packets from the particular machine. Alternatively or conjunctively with outbound packets, the forwarding element can detect an elephant flow by directly monitoring inbound packets to the particular machine.

The forwarding element of some embodiments monitors tunneled traffic to detect elephant flows. In some embodiments, the forwarding element is a tunnel endpoint that operates in conjunction with another tunnel endpoint to monitor and detect elephant flows at either ends of the tunnel. As an example, in detecting elephant flows, a first forwarding element at one end of the tunnel may monitor outbound packets from a first network host to a second network host, and a second forwarding element at the other end of the tunnel may monitor outbound packets from the second network host to the first network host.

As mentioned above, the forwarding element of some embodiments tracks the number of bytes sent to detect an elephant flow. In conjunction with byte count or instead of it, the forwarding element of some embodiments factors in time. As an example, the forwarding element might detect an elephant flow solely based on the duration of the data flow. That is, if the duration of the data flow is over a set period of time, the forwarding might determine that the data flow is an elephant flow. Also, instead of byte count, the forwarding element might calculate data transfer rate (e.g., bytes per second) that identifies rate at which the data is transferring over a given time period. The data transfer rate can be used to allow an elephant flow with slow data transfer rate to progress as normal. This is because such an elephant flow may not be contributing or at least significantly contributing in the latency of other data flows, such as mice flows and non-detected elephant flows.

Once an elephant flow is detected, the forwarding element of some embodiments treats the flow differently than a mouse flow. In some embodiments, a first forwarding element marks each packet associated with a detected elephant flow in some manner to differentiate it from other packets. The packet is then sent over the network and received at a second forwarding element at the next hop or some other subsequent hop. The second forwarding element then uses the marking to process the packet different from other packets associated with other data flows in order to reduce any delays caused by the detected elephant flow in processing the other packets associated with the other data flows. The second element may perform a quality of service (QOS) operation on the packet. For instance, the second forwarding element may place the packet in a particular queue different from one or more other queues used to process other packets (e.g., packets associated with mice flows and non-detected elephant flows). In this manner, one set of packets belonging to a mouse flow is not held in the same queue behind another set of packets belonging to an elephant flow for a prolonged period of time.

In some embodiments, the forwarding sets at least one bit in the packet's header to indicate that the packet belongs to the detected elephant flow. As an example, the forwarding element of some embodiments sets a (Differentiated Services Code Point) DSCP bit in the packet's header and allows the fabric (e.g., another forwarding element in the network) to handle the packet through standard queuing mechanisms. The DSCP bit or some other bit may be set in the packet's tunnel header. The DSCP field provides different levels of service to be assigned to network traffics, such as IP packets. However, if there is no encapsulation, the actual packet can be marked with a marking.

In some embodiments, the forwarding element facilitates in breaking an elephant flow into a number of mouse flows. The basic idea here is to split an elephant follow up into a bunch of mouse flows (e.g., by using more than one ephemeral source port for the flow). This approach has the nice property that the fabric remains simple and uses a single queuing and routing mechanism for all traffic. One way to implement this in an overlay network is to modify the ephemeral port of the outer header to create the necessary entropy needed by the multipathing hardware. In some embodiments, the forwarding element performs a traceroute to identify a network map and chooses different paths based on the network map.

In addition, several embodiments that detect elephant flows based on the size of a packet are described in U.S. patent application Ser. No. 14/231,652, entitled "Detecting an Elephant Flow Based on the Size of a Packet", filed concurrently with this application, and now issued as U.S. Pat. No. 9,548,924. Some embodiments that report elephant flows to a network controller are described in U.S. patent application Ser. No. 14/231,654, entitled "Reporting Elephant Flows to a Network Controller", filed concurrently with this application, and now published as U.S. Publication 2015/0163145. These U.S. Patent Applications are incorporated herein by reference. In addition, some embodiments provide a system that detects an elephant flow by examining the operations of a machine. In some embodiments, the machine is a physical machine or a virtual machine (VM). In detecting, the system identifies an initiation of a new data flow associated with the machine. The new data flow can be an outbound data flow or an inbound data flow. The system then determines, based on the amount of data being sent or received, if the data flow is an elephant flow.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
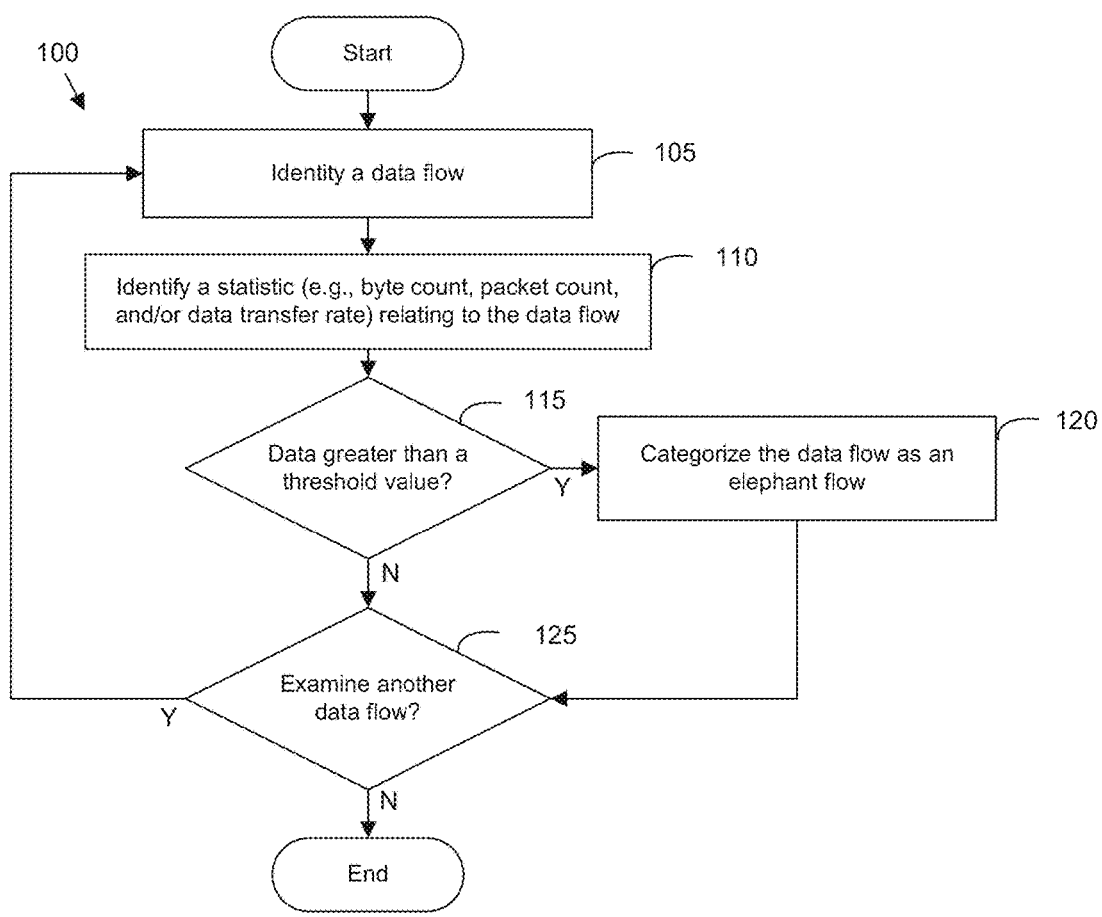
FIG. 1 conceptually illustrates a process that some embodiments use to detect an elephant flow using statistical data associated with a flow entry.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Embodiments described herein provide a forwarding element that detects and handles elephant flows. In detecting, the forwarding element of some embodiments monitors statistics or measurements relating to a data flow. As an example, the forwarding element may track the number of bytes sent in the data flow, and specify, based on the number of bytes, whether the data flow should be classified as elephant flow. In some embodiments, the forwarding element performs the monitoring on a per data flow basis by tracking statistics associated with a flow entry (e.g., in a flow table) that is used to process packets.

Once an elephant flow is detected, the forwarding element of some embodiments treats it differently than a mouse flow. In some embodiments, the forwarding element marks each packet associated with a detected elephant flow in some manner to differentiate it from a packet associated with a mouse flow. The packet is then sent over the network and received at a next hop or some other subsequent hop that recognizes the mark. Thereafter, the packet is placed in a particular queue different from one or more other queues used to process other packets (e.g., packets associated with mice flows and non-detected elephant flows). In this manner, one set of packets belonging to a mouse flow is not held in the same queue behind another set of packets belonging to an elephant flow for a prolonged period of time.

In some embodiments, the forwarding element facilitates in breaking an elephant flow into a number of mouse flows. The basic idea here is to split an elephant up into a bunch of mice (e.g., by using more than one ephemeral source port for the flow). This approach has the nice property that the fabric remains simple and uses a single queuing and routing mechanism for all traffic. One way to implement this in an overlay network is to modify the ephemeral port of the outer header to create the necessary entropy needed by the multipathing hardware.

Several example detection and handling mechanisms will be described in detail below. In particular, Section I describes several example techniques for detecting elephant flows based on a threshold value. This is followed by Section II that describes several example handling a detected elephant flow by marking packets associated with elephant flow with a marking. Section III then several examples of handling a detected elephant flow by breaking the elephant flow into a number of mouse flows. Section IV then describes an electronic system for implementing some embodiments of the invention.

I. Detecting Elephant Flows Based on Statistics

In some embodiments, the forwarding element of some embodiments monitors at least one statistic or measurement relating to a data flow to determine whether the data flow should be classified as an elephant flow. For example, the forwarding element may track the number of bytes sent in a data flow, and specify, based on the number of bytes, whether the data flow should be classified as elephant flow. In some embodiments, the forwarding element performs the monitoring on a per data flow basis by tracking statistics associated with a rule or flow entry (e.g., in a flow table) that is used to process packets.

In monitoring, the forwarding element of some embodiments finds an elephant flow by updating and checking one or more counters (e.g., byte sent, packet sent) associated with a corresponding flow entry. As an example, the forwarding element might check whether the number of bytes sent has reached a certain threshold limit. When the threshold limit has been reached, the forwarding element then specifies that the data flow associated with the flow entry is an elephant flow. The term "packet" is used here as well as throughout this application to refer to a collection of bits in a particular format sent across a network. One of ordinary skill in the art will recognize that the term "packet" may be used herein to refer to various formatted collections of bits that may be sent across a network, such as Ethernet frames, TCP segments, UDP datagrams, IP packets, etc.

In some embodiments, the forwarding element of some embodiments may also take into account the duration of time that the flow entry has been in memory or cache to handle data transfer. For instance, the forwarding element of some embodiments periodically examines a cache to identify which flows remain in the cache to process packets while others flows timeout or expire. In some embodiments, the forwarding element calculates number of bytes sent over a specified time (e.g., bytes per second (Bps)). Alternatively, if the forwarding element finds a flow that is constantly being used to process packets, the forwarding element may specify the data flow associated with the flow entry as an elephant flow. For instance, the forwarding element may examine the packet count and determine whether a data flow should be categorized as an elephant flow based on the packet count.

In some embodiments, the forwarding element is an edge forwarding element (EFE). Different from a non-edge forwarding element (NEFE), the EFE is in a unique position to identify elephant flows. The EFE has the advantage over a NEFE in that it is the last forwarding element before one or more end machines (e.g., VMs, computing device). Thus, the EFE can more easily monitor traffic coming from and going to an end machine than a NEFE. Such dynamic detection is more difficult with a NEFE. For instance, performing the detection within the network by a NEFE can be difficult because of flow tracking in high-density switching application-specific integrated circuits (ASICs). A number of sampling methods have been proposed, such as sampling the buffers or using sFlow. However, the accuracy of such approaches remains unclear due to the sampling limitations at high speeds.

A. Example Process

Having described a brief overview of detecting elephant flows, an example process will now be described. FIG. 1 conceptually illustrates an example process 100 that some embodiments use to detect an elephant flow using statistical data associated with a data flow. In some embodiments, the process 100 is performed by a forwarding element.

The process 100 begins when it identifies (at 105) a data flow. The process 100 then retrieves (at 110) a statistic or measurement relating to the data flow. For example, the process 100 might retrieve a byte count, a packet count, and/or time associated with the flow. The byte count identifies the number of bytes sent using a rule or flow entry (in a flow table or a cache). The packet count identifies the number of packets sent in the data flow with the rule. The time identifies the duration of time that the rule has been in memory (e.g., in a flow table or cache) to process packets. In some embodiments, the process 100 computes bytes over a specified time and/or rate over a specified time to determine if a flow entry is associated with a data transfer session that is transferring large amounts of data.

At 115, the process 100 determines whether the statistical data is greater than a threshold value. If so, the process 100 specifies (at 120) that the data flow is an elephant flow. In specifying, the process 100 of some identifies one or more pieces of information that can be used to identify packets in the elephant data flow. The process 100 may identify tunnel information, such as the tunnel ID, the IP address of the source tunnel endpoint (e.g., the hypervisor), and the IP address of the destination tunnel endpoint. The process 100 of some embodiments identifies the elephant flow packet's ingress port, source transport layer (e.g., UDP or TCP) port, destination transport layer port, Ethernet type, source Ethernet address, destination Ethernet address, source IP address, and/or destination IP address.

If the statistical data is less than the threshold value, the process determines (at 125) whether to examine another flow entry. If there is another flow entry, the process 100 returns to 105, which is described above. Otherwise, the process 100 ends.

Some embodiments perform variations on the process 100. The specific operations of the process 100 may not be performed in the exact order shown and described. The specific operations may not be performed in one continuous series of operations, and different specific operations may be performed in different embodiments.

B. Example Implementation

Figure 2:
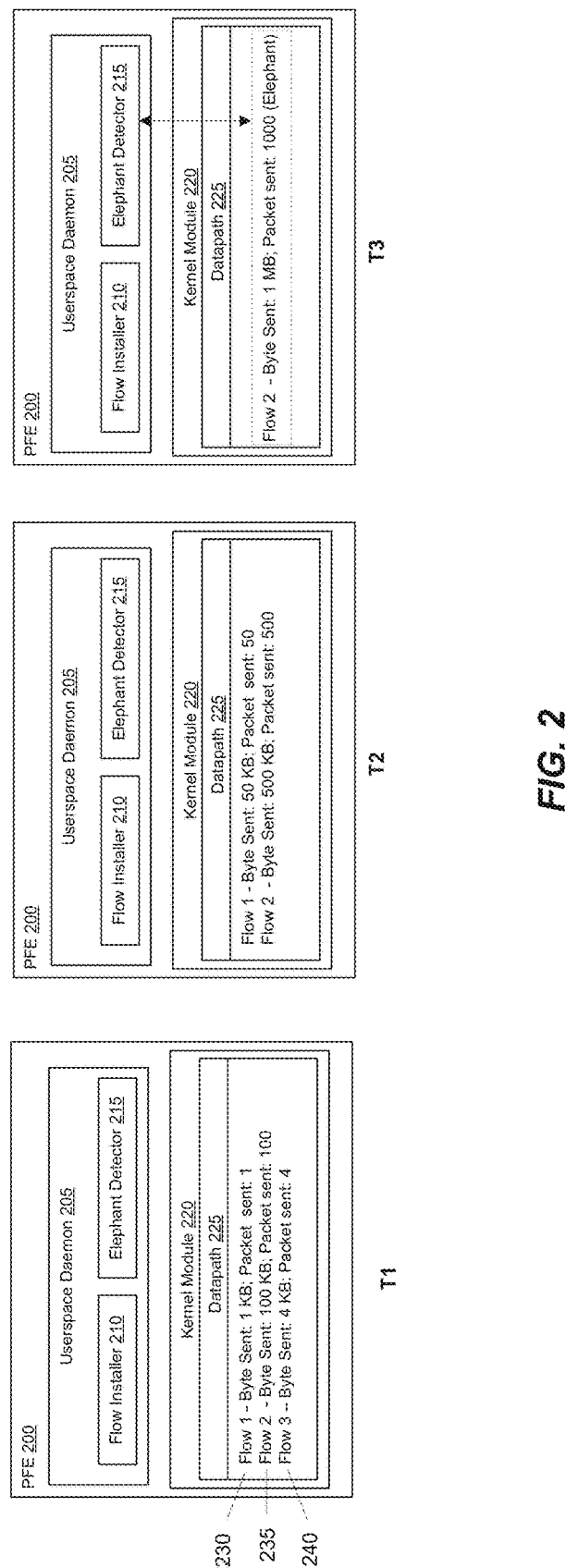
FIG. 2 provides an illustrative example of a physical forwarding element that detects elephants using statistical data associated with flow entries.

An example implementation of a forwarding element that examines statistics will now be described. FIG. 2 provides an illustrative example of a forwarding element 200 that detects elephant flows using statistical data associated with different flow entries. The figure shows the forwarding element 200 at three different times (T1-T3).

In the example of FIG. 2, the forwarding element 200 is a software forwarding element, such as Open vSwitch. The software forwarding element operates on a computing device (e.g., x86 box). However, the forwarding element can be a hardware forwarding element that has hardware designed to support in hardware forwarding. For instance, the forwarding element may have application-specific integrated circuits (ASICs) with a Content Addressable Memory (CAM) or Ternary CAM (TCAM).

In some embodiments, the forwarding element is an edge forwarding element. The edge forwarding element is in a unique position to monitor data flows because it represents a last forwarding element before one or more end machine. For instance, the edge forwarding element may be communicatively coupled to a particular machine. The forwarding element can then detect an elephant flow by directly monitoring outbound packets from the particular machine. Alternatively or conjunctively with outbound packets, the forwarding element can detect an elephant flow by directly monitoring inbound packets to the particular machine.

The forwarding element of some embodiments monitors tunneled traffic to detect elephant flows. In some embodiments, the forwarding element is a tunnel endpoint that operates in conjunction with another tunnel endpoint to monitor and detect elephant flows at either ends of the tunnel. As an example, in detecting elephant flows, a first forwarding element at one end of the tunnel may monitor outbound packets from a first network host to a second network host, and a second forwarding element at the other end of the tunnel may monitor outbound packets from the second network host to the first network host.

In some embodiments, the forwarding element 200 (e.g., software or hardware) of some embodiments is a physical forwarding element that implements one or more logical forwarding elements with one or more other physical forwarding elements. For instance, the physical forwarding element may operate in conjunction with at least one other forwarding element to different logical forwarding element for different tenants, users, departments, etc. that use the same shared computing and networking resources. Accordingly, the term "physical forwarding element" is used herein to differentiate it from a logical forwarding element.

In the example of FIG. 2, the forwarding element 200 includes a userspace daemon 205, a kernel module 220, and a datapath cache 225. The userspace daemon 205 of some embodiments runs as a background process on a host machine. For instance, as its name implies, the userspace daemon may operate as a demon process in the userspace of the machine's operating system (OS). The daemon 205 of some embodiments receives management information and switch configuration (e.g., from one or more network controllers and/or a configuration database). The management information includes bridge and tunnel information, and the switch configuration includes various flows. These flows are stored in one or more flow tables (not shown).

The kernel module 220 accesses the datapath 225 to find matching flows to process packets. The datapath 225 contains any recently used flows. The flows may be fully specified, or may contain one or more match fields that are wildcarded, in some embodiments. Typically, a flow or rule includes a set of match fields to match against a set of header fields of a packet. The rule also includes a set of actions (e.g., one or more actions) to perform on the packet if the set of header fields matches the set of match fields. When the kernel module 220 receives the packet's header values or hashes of a hash of the header values, it tries to find a matching flow entry or rule installed in the datapath 225. If it does not find one, then the control is shifted to the userspace daemon 205.

To handle such cases, the userspace daemon 205 includes a flow installer 210. In some embodiments, the flow installer 210 is referred to in some embodiments as open flow protocol datapath interface (ofproto-dif). When there is a miss in the datapath 225, the flow installer 210 is called to install a rule (i.e., a flow entry) in the datapath cache based on one or more flows in a set of one or more flow tables. In this manner, the forwarding element 200 can quickly process each subsequent packet with the same set of header values using the rule in the datapath cache 225. The datapath cache 225 provides a fast path to process incoming packets because it does not involve any translation at the userspace by the userspace daemon 205.

In some embodiments, the forwarding element 200 includes a detection module 215 is responsible for detecting elephant flows. Conceptually, the detection module 210 module retrieves data relating to a flow entry in the datapath 225. The detection module 210 then compares the data against a threshold value to determine if the flow entry is associated with an elephant flow.

Different embodiments use different mechanisms to examine statistics or measurements relating to various flows. In some embodiments, the physical forwarding element 200 iterates through each flow (e.g., in the datapath cache or in a flow table) periodically and/or when triggered. For instance, the forwarding element may be configured with a rule or programmed to validate each flow in the datapath cache every set period of time (e.g., every one second at minimum). Alternatively, or conjunctively, the physical forwarding element can be triggered to perform dynamic detection each time a flow entry or rule (e.g., in the datapath cache or in a flow table) is used to process a packet.

Having described several components of the forwarding element 200, an example operation of the forwarding element will now be described by reference to three time periods (T1-T3) that are shown in FIG. 2. In this example, the forwarding element is examining statistic relating to flows in the datapath 225. However, the flows could be stored anywhere (e.g., in a memory special space, such a TCAM, in a flow table, etc.).

At T1, the forwarding element 200 has three flow entries 230-240 in the datapath 225 to process incoming packets. Each flow entry is associated with statistical data, such as byte sent and packet sent. The flow installer 210 might have installed each of these flow entries to quickly process incoming packets. In the example of T1, the first flow entry 230 has been used to process one packet, the second flow entry 235 has been used to process a hundred packets, and third flow entry 240 has been used to process four packets. At this time (T1), the detection module might be examining data relating the flow entries 230-240 in order to find an elephant.

T2 represents sometime after T1. At T1, the forwarding element 200 now only has two flow entries 230 and 235 in the datapath 225 to process incoming packets. Particularly, the flow entry 240 has been removed from the datapath 225. In this example, the flow entry 240 was removed from the database cache 225 because it was no longer being used to process any incoming packets. In some embodiments, the userspace daemon 205 performs a flow eviction process to remove each flow that is no longer being used from the datapath 225. The flow eviction process determines if a flow entry in the datapath has expired and, if so, removes the flow entry from the datapath. For instance, if the flow entry has not been used for a set period of time, the userspace daemon 205 deletes the flow entry from the datapath 225. This feature prevents the datapath 225 from being filled with potentially many flow entries that has not been used for some time, which in turns speeds up the classifier lookup.

T2 shows that the flow entries 230 and 235 were used to process additional packets. Namely, the flow entry 230 has been used to process 50 packets, and the flow entry 235 has been used to process 500 packets. Again, at T2, the detection module 215 might be examining data relating each of the flow entries 230 and 235 in order to determine if the corresponding flow entry belongs to an elephant flow.

T3 represents sometime after T2. At T3, the forwarding element 200 now only has one flow entry 235 left in the datapath 225 to process packets. Specifically, the flow entry 230 has been removed from the datapath 225. The flow entry 230 was removed from the database cache because it was no longer being used to process packets. T3 also shows that the flow entry 235 has been used to process additional packets. In particular, the flow entry 235 has now been used to process 1000 packets.

At T3, the detection module 215 has retrieved data relating the flow entry 235. The detection module 215 has also compared the data against one or more threshold values. Based on the comparison, the detection module 215 has detected that the flow entry 235 as being associated with an elephant flow.

C. Flows with Wildcard Match Fields

The forwarding element of some embodiments supports match rules with wildcard match fields. Each rule may include one or more wildcard fields and/or one or more fields that are at least partially wildcarded. For instance, a first portion of an IP destination address match field may be fully specified, while the remaining portion of the IP address match field is wildcarded. The forwarding element uses such non-exact match rules to reduce the overhead in making packet forwarding decisions (e.g., at the userspace with the userspace daemon). In some embodiments, a rule with a wild card match field (or a portion of the match field wildcarded) is also referred to as a megaflow. The term "megaflow" is used to distinguish the flow from an exact match rule, also referred to herein as a "microflow". A small number of megaflows installed into the kernel can process a diverse collection of packets, eliminating much overhead by sending fewer packets from the kernel to userspace.

The problem with such a megaflow is that it may be used to process multiple different data flows. The megaflow may be used process packets in an elephant flow, as well as a mouse flow. This is because at least one match field (or a portion thereof) is wildcarded or sub-masked. For instance, several different packets, which are associated with different data flows, can be processed by one wildcard flow as long as each packet has a set of header values that match a set of non-wildcard fields. Therefore, the statistical data associated with the megaflow may be unreliable data source to make a determination of whether a data flow should be classified as an elephant flow.

A first example solution to the megaflow problem is for the forwarding element to disable the megaflow feature when elephant detection feature is enabled. A second example solution would be to perform dynamically disable the megaflow feature. For instance, the forwarding element can periodically disable or shoot the megaflow feature and see which packets are sent up to userspace. The idea here is to periodically remove one or more megaflows from the datapath and check what gets reported. The forwarding element may then decide, based on the report, that a megaflow may be associated with an elephant flow. A third example solution to the megaflow problem is to sample what microflows are in the datapath. For instance, the forwarding element would sample the datapath periodically for different microflows. If a forwarding element encounters a same microflow multiple times, the forwarding element can check the flow's statistical data to determine if the microflow is associated with an elephant data flow.

In some embodiments, the forwarding element caches megaflows but also caches one or more microflows associated with each megaflow. That is, for each wildcard flow, the forwarding element can still keep track of each non-wildcard flow relating to the wildcard flow. For instance, the forwarding element can push down a wildcard flow into the datapath; however, on a per CPU basis, the forwarding element can have non-wildcard flows. Each of these non-wildcard flows can then be exposed or queried to retrieve the corresponding statistical data.

Figure 3:
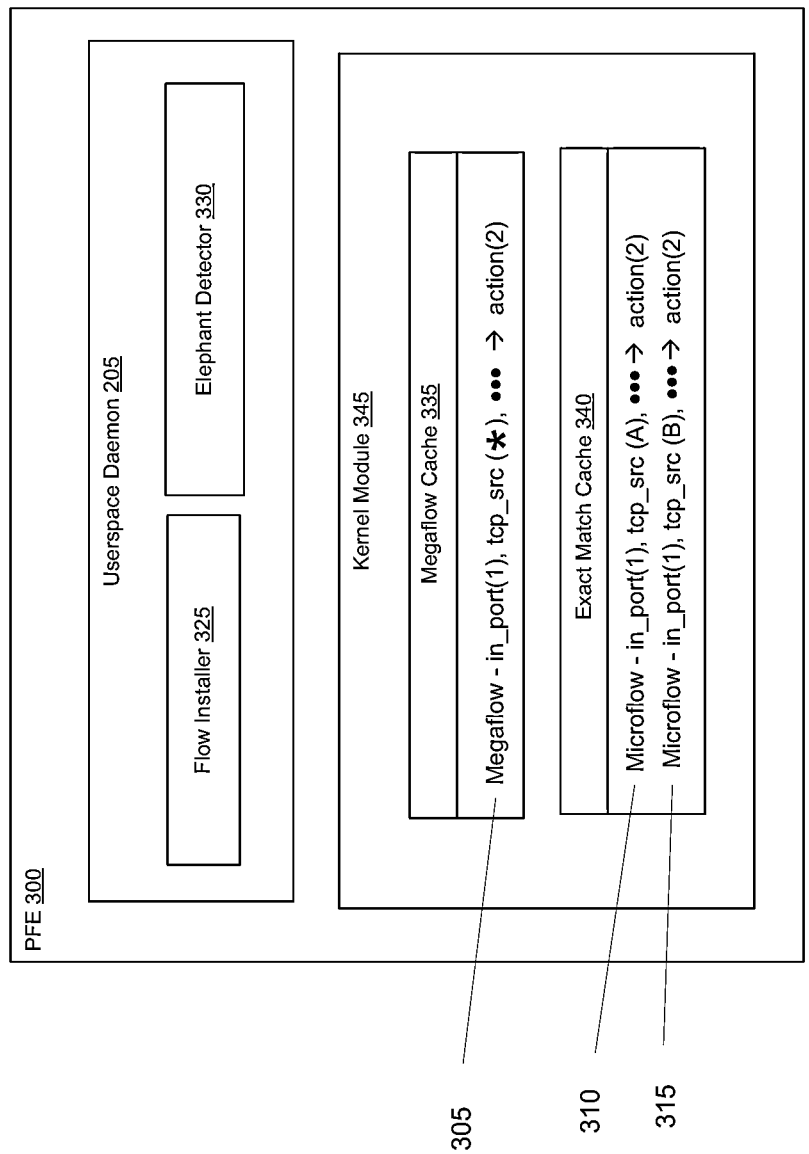
FIG. 3 illustrates an example of how a forwarding element retrieves statistic relating to a microflow.

FIG. 3 illustrates an example of how a forwarding element 300 caches a megaflow 305 and the megaflow's corresponding microflows 310 and 315. In this example, the forwarding element 300 stores the megaflow 305 in a megaflow cache 335 and stores the microflows 310 and 315 in an exact match cache 340. In some embodiments, the kernel module 345 first consults the exact-match cache 340 to find a matching microflow. If a match is found, the kernel module 345 processes the packet using a matching microflow. If there is a miss in the exact match cache 345, the kernel module 345 may consult the megaflow cache 335. If there is a miss in the megaflow cache 335, the packet is sent to the userspace daemon 320. The daemon's flow installer 325 receive the packet and consult one or more flow tables (not shown) to generate a new flow (e.g., a megaflow). In some embodiments, the exact match cache 340 is populated on demand from the consulting megaflow cache 335.

In the example of FIG. 3, the elephant detector 330 of some embodiments examines statistical data associated with each of the two microflows 310 and 315 to determine whether the corresponding data flow should be classified as an elephant flow. That is, instead of examining statistical data relating to the megaflow 305, the elephant detector 330 examines statistical data relating to each of the two microflows 310 and 315.

Another alternate approach to the solving the megaflow problem is to perform recirculation. The recirculation can be performed at the kernel space with the kernel module 345, in some embodiments. Recirculation entails finding a matching flow in one table and performing a resubmit action to another table. For example, in the example of FIG. 3, the megaflow 305 may be associated with a "resubmit" action to consult the exact match cache 340. Here, the kernel module 345 would first check the megaflow cache 345 to match a packet against a megaflow. If there is a match and the megaflow specifies a resubmit action, the kernel module 345 may then consult to exact match cache to identify a microflow. Thereafter, the elephant detector can then examine the statistical data associated with the micro flow to determine if is associated with an elephant data flow.

II. Marking Packets Associated with an Elephant Flow

Once an elephant flow is detected, the forwarding element of some embodiments treats the flow differently than a mouse flow. In some embodiments, a first forwarding element marks each packet associated with a detected elephant flow in some manner to differentiate it from other packets. The packet is then sent over the network and received at a second forwarding element at the next hop or some other subsequent hop. The second forwarding element then uses the marking to process the packet different from other packets associated with other data flows in order to reduce any delays caused by the detected elephant flow in processing the other packets associated with the other data flows. The second element may perform a quality of service (QOS) operation on the packet. For instance, the second forwarding element may place the packet in a particular queue different from one or more other queues used to process other packets (e.g., packets associated with mice flows and non-detected elephant flows). In this manner, one set of packets belonging to a mouse flow is not held in the same queue behind another set of packets belonging to an elephant flow for a prolonged period of time.

In some embodiments, the forwarding sets at least one bit in the packet's header to indicate that the packet belongs to the detected elephant flow. As an example, the forwarding element of some embodiments sets a (Differentiated Services Code Point) DSCP bit in the packet's header and allows the fabric (e.g., another forwarding element in the network) to handle the packet through standard queuing mechanisms. The DSCP bit or some other bit may be set in the packet's tunnel header. However, if there is no encapsulation, the actual packet can be marked with a marking.

B. Example Process

Figure 4:
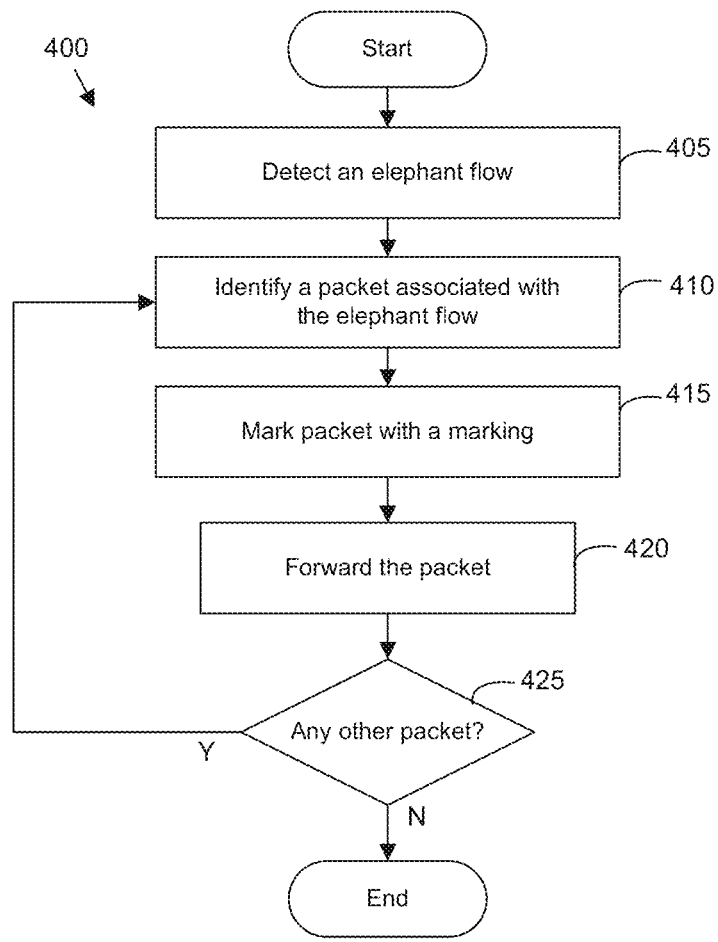
FIG. 4 conceptually illustrates a process that some embodiments use mark packets associated with an elephant flow.

Having described a brief overview of marking packets, an example process will now be described. FIG. 4 conceptually illustrates a process 400 that some embodiments use mark packets associated with an elephant flow. In some embodiments, the process 400 is performed by a forwarding element. The process 400 begins when it detects (at 405) an elephant flow.

In some embodiments, the process 400 detects an elephant flow based on one or more statistics associated with a data flow. The process of some embodiments the size of each of several packets in a data flow to determine whether the data flow is an elephant flow. The process inspects the size because, in order for the packet to be of a certain size, the data flow had to already have gone through a slow start in which smaller packets are transferred and by definition be an elephant flow. As an example, the Transmission Control Protocol (TCP) uses a slow start algorithm in order to avoid congesting the network with an inappropriately large burst of data. The TCP also uses the algorithm to slowly probe the network to determine the available capacity. The process of some embodiments takes advantage of such a slow start algorithm by using it to detect elephant flows.

The process 400 of some embodiments detects an elephant flow by examining the operations of a machine. The elephant flow represents a long-lived data flow or a continuous traffic flow that is associated with large data transfer. In some embodiments, the machine is a physical machine or a virtual machine (VM). In detecting, the process 400 identifies an initiation of a new data flow associated with the machine. The new data flow can be an outbound data flow or an inbound data flow. The process 400 then determines, based on the amount of data being sent or received, if the data flow is an elephant flow.

As shown in FIG. 4, the process 400 then identifies (at 410) a packet associated with the elephant flow. At 415, the process 400 marks the packet's header to indicate that the packet belongs to an elephant flow. For instance, the process 400 of some embodiments sets a DSCP bit in the packet's tunnel header. After marking the header, the process 400 then forwards (at 420) the packet to another forwarding element. Here, the process 400 marks the packet (e.g., sets the DSCP bit) and lets the fabric handle the packet through standard queuing mechanisms. An example queuing mechanism will be described below by reference to FIG. 7.

The process 400 then determines (at 425) whether there is another packet that is associated with the elephant flow. If so, the process 400 returns to 410, which is described above. Otherwise, the process 400 ends. Here, the process identifies an elephant flow and marks, based on the identification, packet headers (e.g., with DSCP (QOS) marking) before sending encapsulated packet to the physical fabric. The physical fabric uses this bit to assign packets to different internal queues. This prevents elephant connections ballooning or increasing the latency of mice connections, which are more likely to be about low-latency application operations.

Some embodiments perform variations on the process 400. The specific operations of the process 400 may not be performed in the exact order shown and described. The specific operations may not be performed in one continuous series of operations, and different specific operations may be performed in different embodiments.

B. Example Implementations

Figure 5:
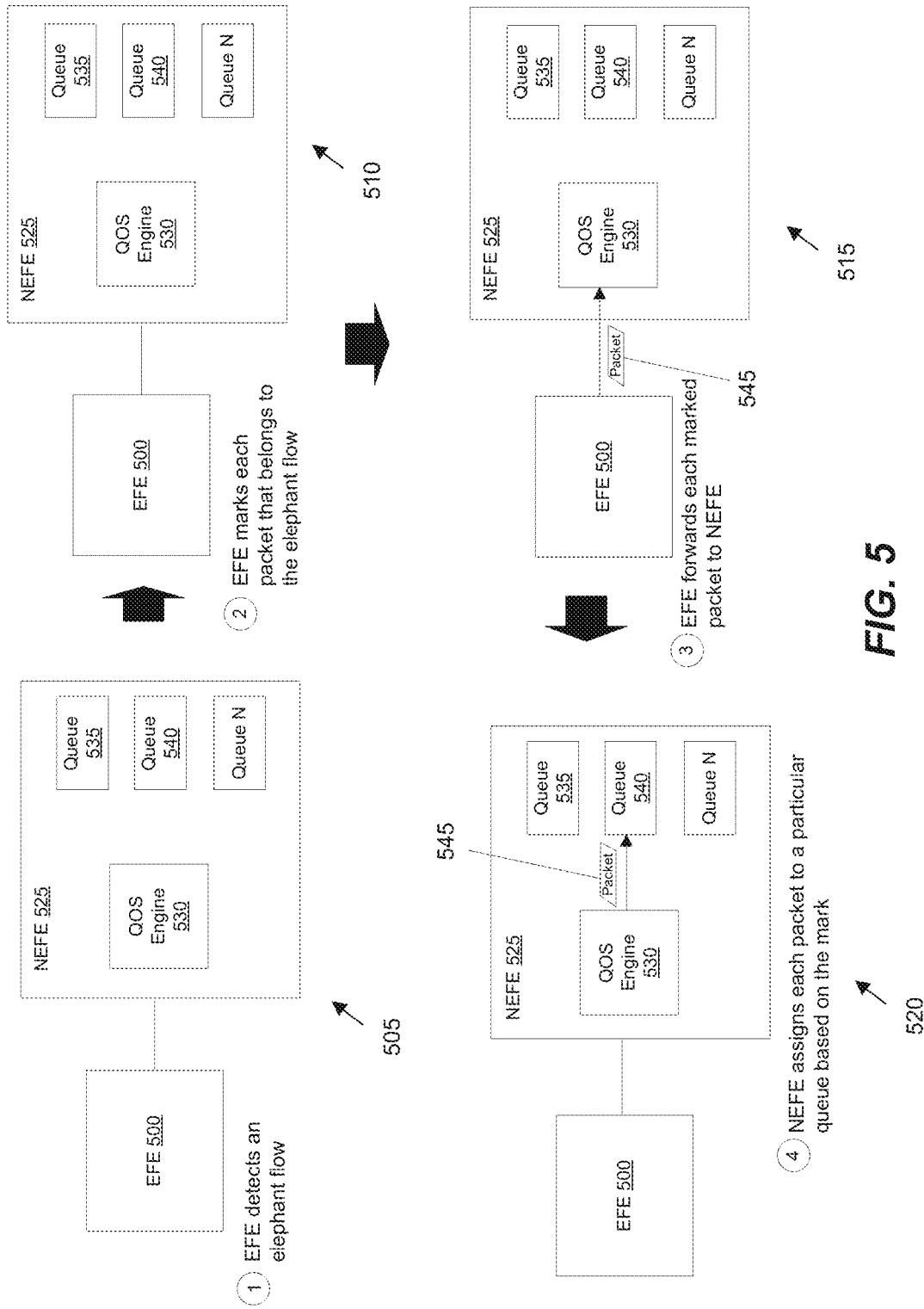
FIG. 5 provides an illustrative example how a forwarding element treats a packet marked with such a marking.

FIG. 5 provides an illustrative example marking a packet and processing the packet based on the marking. In particular, the figure shows an implementation of an edge forwarding element 500 that mark the packet associated with an elephant flow. The figure also shows an implementation of a non-edge forwarding element 525 that process the packet based on the marking Four operational stages 505-520 of the forwarding elements 500 and 525 are shown in the figure.

In the first stage 505, the edge forwarding element 505 detects an elephant flow. The second stage 510 shows the edge forwarding element 505 marking a packet that belongs to the elephant flow. This is followed by the third stage 515, which shows the edge forwarding element 505 forwarding the packet 545 to the non-edge forwarding element 525.

In the fourth stage 520, the non-edge forwarding element 505 has received the packet from the edge forwarding element 525. Specifically, the packet 545 has been received by a Quality of Service (QOS) engine 530 that executes on the non-edge forwarding element 525. In this example, the non-edge forwarding element includes a number of queues (e.g., 535, 540, etc.). Typically, a forwarding element (e.g., top-of-rack switch) has several different queues (e.g., eight queues), and the forwarding element can be configured to specify how packets are placed into the different queues and how the queues are drained. Here, the QOS engine reads the marking, select the queue 540 based on the marking, and place the packet 545 in that selected queues. In this example, since the elephants and mice are all sharing the same infrastructure. The marking is used so that one or more packets belonging to a mouse flow is not stuck in a queue behind a group of packets belong to an elephant flow.

III. Breaking Elephants into Mice

In some embodiments, the forwarding element facilitates in breaking an elephant flow into a number of mouse flows. The basic idea here is to split an elephant follow up into a bunch of mouse flows (e.g., by using more than one ephemeral source port for the flow). This approach has the nice property that the fabric remains simple and uses a single queuing and routing mechanism for all traffic. One way to implement this in an overlay network is to modify the ephemeral port of the outer header to create the necessary entropy needed by the multipathing hardware.

A. Example Process

Figure 6:
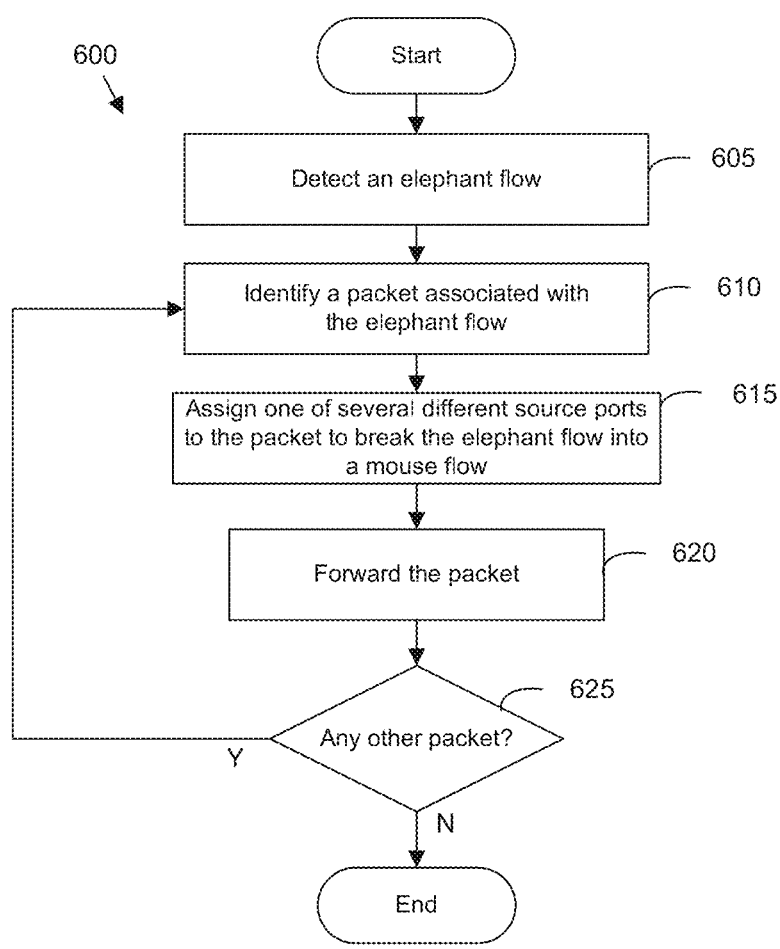
FIG. 6 conceptually illustrates a process that some embodiments use to break elephants into mice.

FIG. 6 conceptually illustrates a process 600 that some embodiments use to break elephants into mice. In some embodiments, the process 600 is performed by a forwarding element. The process 600 begins when it detects (at 605) an elephant flow. In some embodiments, the process 600 detects an elephant flow using one or more techniques described in Section I above. The process 600 then identifies (at 610) a packet associated with the elephant flow.

At 615, the process 600 assigns one of several different source ports to the packet. After marking the header, the process 600 then forwards (at 620) the packet to another forwarding element. The process 600 then determines (at 625) whether there is another packet that is associated with the elephant flow. If so, the process 600 returns to 610, which is described above. Otherwise, the process 600 ends.

Some embodiments perform variations on the process 600. The specific operations of the process 600 may not be performed in the exact order shown and described. The specific operations may not be performed in one continuous series of operations, and different specific operations may be performed in different embodiments.

B. Example Implementations

Figure 7:
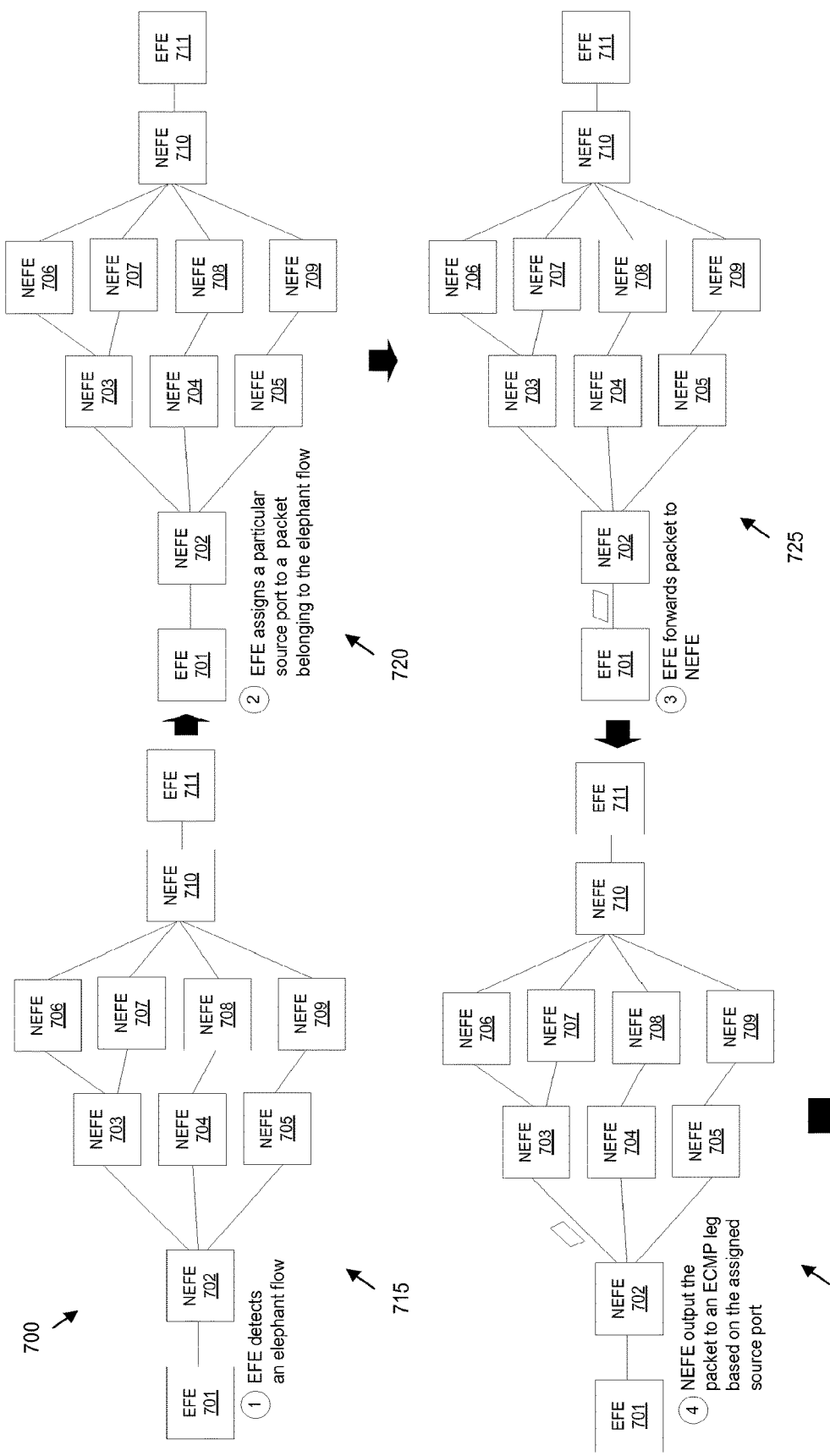
FIG. 7 shows an example of a forwarding element that assigns a particular source port to a packet so that the packet is sent over a particular route.
Figure 8:
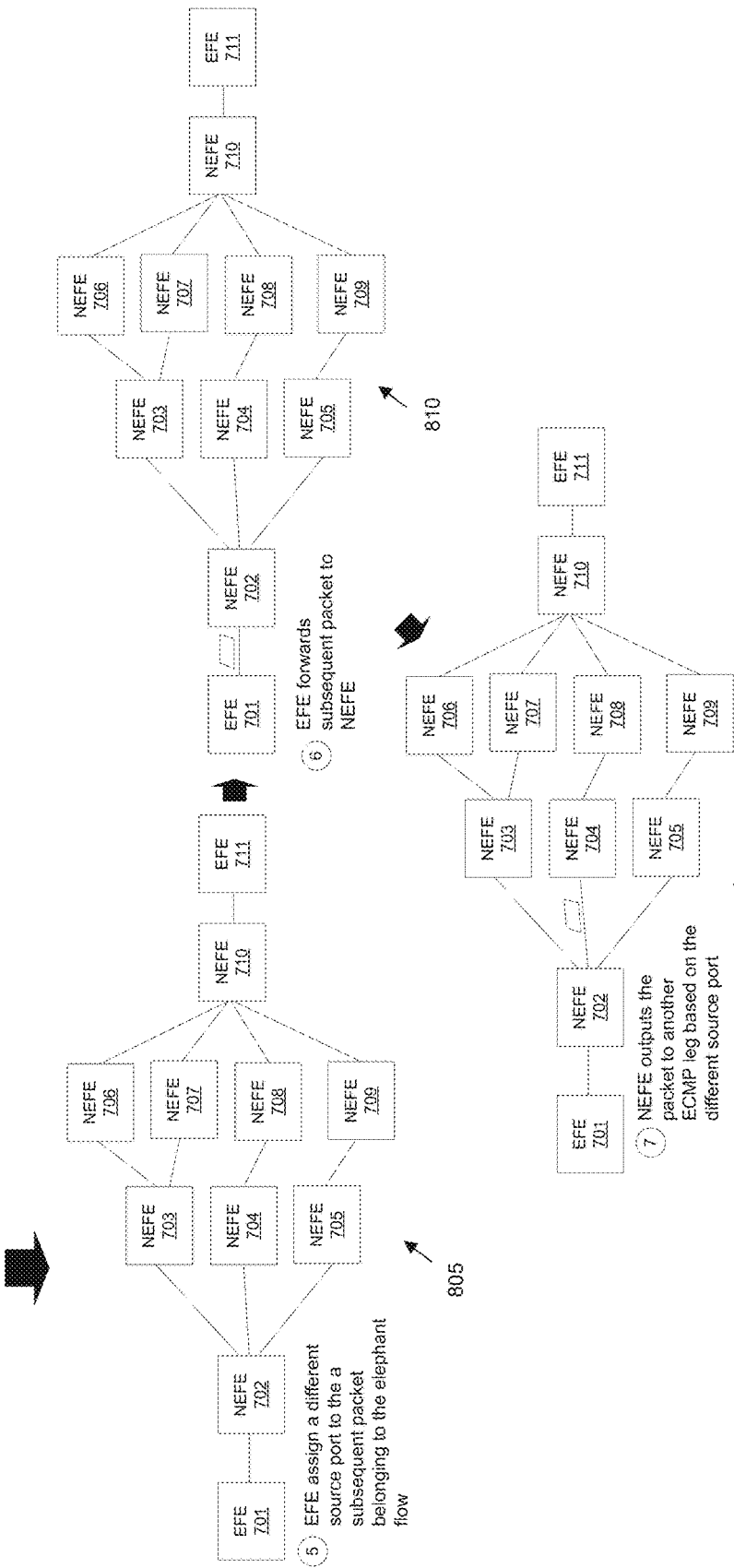
FIG. 8 shows the forwarding element assigning a different source port to another packet so that the packet is sent over different route.

FIGS. 7 and 8 illustrate an example of how some embodiments break an elephant flow into a mouse flow. Specifically, FIG. 7 shows an example of a forwarding element 701 that assigns a particular source port to a packet so that the packet is sent over a particular route. This is followed by FIG. 8, which shows the forwarding element 701 assigning a different source port to another packet so that the packet is sent over different route. These figures show a number of forwarding elements 701-711. Each of these forwarding elements can be a switch, a router, or any other appliance that is capable of receiving and forwarding packets. To simplify the description, the figures show two edge forwarding elements (EFE 701 and EFE 711) and nine non-edge forwarding element (NEFEs 702-710). The NEFEs 703-709 elements conceptually represent, in some embodiments, a fabric or network topology in which traffic is spread across multiple physical links. Also, these figures show the EFE 701 forwarding packets to EFE 711.

Four operational stages 715-730 of a network 700 are shown in FIG. 7. The first stage 715 shows the EFE 701 detecting an elephant flow. The second stage 720 shows that, in response to the detection, the EFE 701 assigns a particular source port to the packet's outer header. For instance, the EFE 701 may assign a hash value to the transport layer (TCP or UDP) source port header field of the packet. The third stages 715 shows the EFE1 forwarding the packet to the NEFE 702. The fourth stage 720 shows that the NEFE 702 has received the packet. Here, the NEFE 702 chooses a particular equal-cost multi-path routing (ECMP) leg to route the packet based on the assigned source port. Standard equal ECMP methods entail hashing on address and port numbers in the outer protocol headers. Specifically, the NEFE 702 has chosen to forward the packet to NEFE 703. Accordingly, in the fourth stage 720, the NEFE 703 sends the packet to NEFE 703.

FIG. 8 shows three additional stages 805-815 of the network 700. These stages 805-815 are a continuation of the ones shown in the previous figure. The first stage 805 of FIG. 8 shows the EFE 701 encapsulating a next packet associated with the elephant flow. Specifically, the stage 805 illustrates that the EFE 701 assigns a different source port.

The second stage 815 shows the EFE 701 forwarding the next packet to the NEFE 702. The third stage 815 shows that the NEFE 702 has received the next packet. Here, the NEFE 702 breaks the elephant flow into a mouse flow by choosing another ECMP leg to route the next packet based on the different source port. Specifically, instead of NEFE 703 or NEFE 705, the NEFE 702 has chosen to forward the packet to NEFE 704. Accordingly, in the third stage 815, the NEFE 702 sends the packet to NEFE 704.

In the example described above, the core static ECMP is extended by edge sourced dynamic-load based entropy. That is, the overlays allow the system to repurpose the classic 5-tuple used for ECMP within the fabric. The 5-tuple comprising the source IP address, destination IP address, protocol type, TCP/UDP source port, and TCP/UDP destination port. A single logical connection does not need to translate into one outer (Stateless Transport Tunneling (STT), Virtual Extensible LAN (VXLAN)) 5-tuple for its lifetime but instead the system can use several outer 5-tuples over the lifetime of the connection. A practical way to achieve this is to reassign the outer source port after a set of packets has been sent over the logical connection. This will result in more uniform traffic distribution across the physical fabric links and hence more bandwidth available for the endpoints.

Also, in the example described above, a first forwarding assigns different header values (e.g., hashes) for different packets in a same data flow. The packets are then processed by a second forwarding to break the elephant data flow into one or more smaller mouse data flows. One of ordinary skill in the art would understand that these operations could be performed on one forwarding element rather than multiple forwarding element. For instance, a forwarding element of some embodiments can monitor a data flow associated with a network host to detect an elephant flow, and perform load balancing by sending traffic belonging to a detected elephant flow along different paths. The forwarding element may also generate different hashes to send traffic along the different paths.

C. Reordering Problem

One downside of using the STT protocol may be one of its prominent features: efficiently sending large contiguous blocks of data. Ideally, many small packets would be sent through different paths. However, the TCP segmentation offload (TSO) engine takes a large (up to 64 KB) TCP segment and breaks it into MTU-sized fragments with the same TCP header (and thus, source port). For instance, the forwarding element may calculate a hash of the inner packet headers, and place the hash in the outer source (e.g., UDP, TCP) port where it feeds into a link aggregation control protocol (LACP)/ECMP hash calculation. This means each segment will take the same path instead of multiple routes. On the other hand, when packets take multiple routes, they can introduce reordering due to different numbers of hops or queuing delays.

Figure 9:
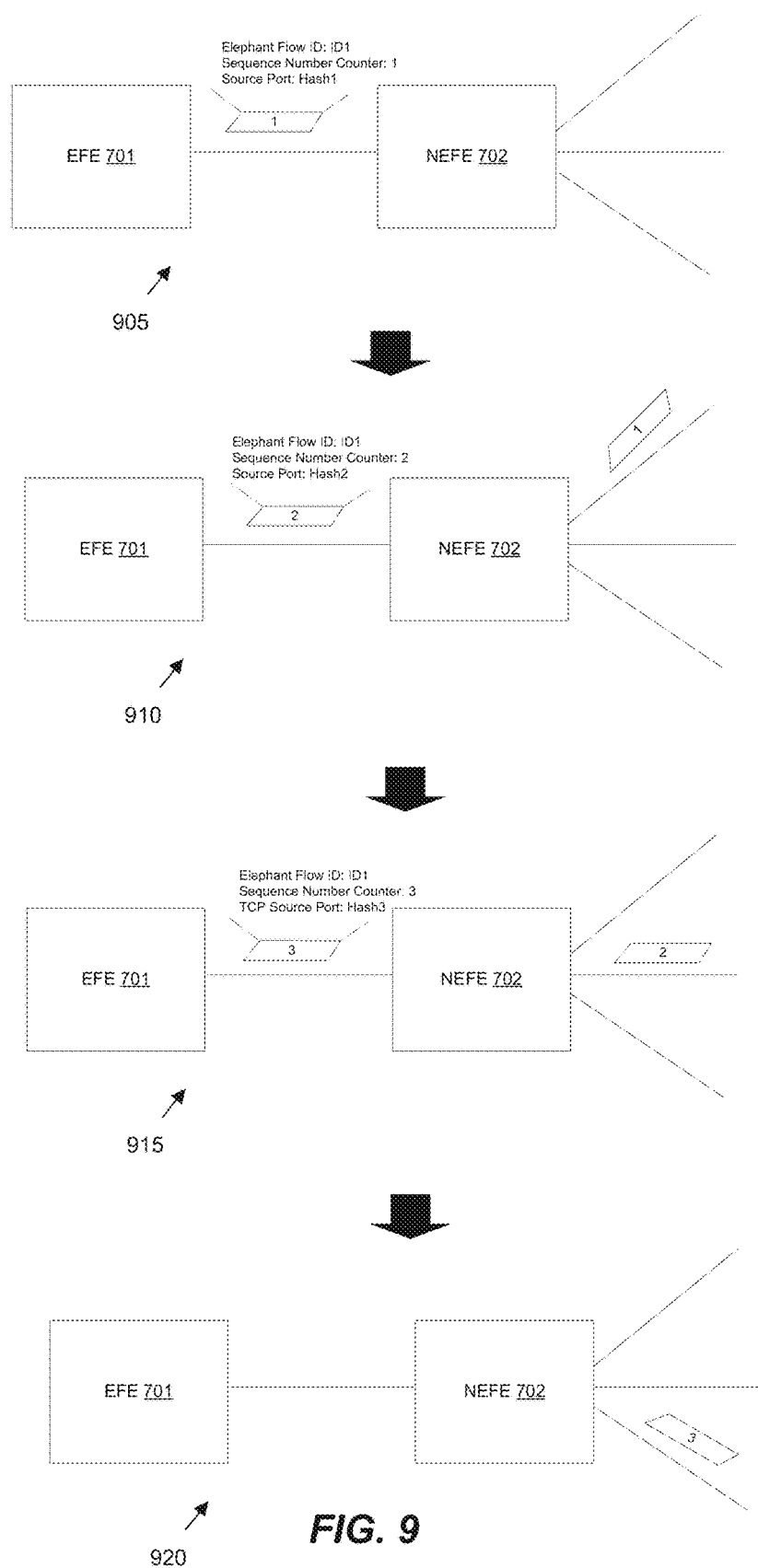
FIG. 9 illustrates an example of tagging several packets in a detected elephant flow.

To prevent reordering, the system of some embodiments introduces additional state into a particular protocol, such as STT, VXLAN, etc. FIG. 9 illustrates an example of tagging several packets in a detected elephant flow. Specifically, this figure illustrates in four stages 905-920 how the EFE 701 adds additional state to each of several packets in the detected elephant flow. In this example, a small extension is be made to the protocol header (e.g., STT header) for handling tagged elephants. The header now includes an elephant flow identifier (ID). The identifier can be any number of bits that is wide enough to support various different elephant flows, such as 32-bit. In some embodiments, the header also includes a (e.g., 32-bit) sequence number counter. This sequence number is increments each time a packet is sent for the data flow.

When an elephant flow is detected, the sender's protocol stack (e.g., STT stack) can choose multiple source ports for the elephant flow. The sender can also use the same elephant flow ID and increment a sequence number counter for each successive packet. This is illustrated in the four stages 905-920 of FIG. 9. Specifically, in the first stage 905, the EFE 701 assign a particular elephant flow ID for each packet in a detected elephant flow. The EFE 701 has also assigned a sequence number to the first packet. In addition, the EFE 701 has assigned a hash value to the source port of the packet's outer header. In some embodiments, the hash value is generated by hashing a number of tuples (e.g., in the inner header).

In the second stage 910, the NEFE 2702 has received the first packet from the EFE 701. The NEFE 702 then forwards the first packet to a particular path based on the hash value. The second stage 910 also illustrates the EFE 701 sending second packet. The second packet is assigned the same elephant flow ID; however, the second packet's sequence number counter has been incremented by one, and a different hash value has been assigned to the source port of the second packet's outer header.

The third stage 915 is similar to the second stage 910. In particular, the NEFE 2702 has received the second packet from the EFE 701. The NEFE 702 then forwards the second packet to another path based on the hash value. The third stage 910 also illustrates the EFE 701 sending a third packet with the same elephant flow ID, an incremented sequence number, and another different hash value. The fourth stage 920 shows the NEFE 702 forwarding the third packet to another different path based on the third packet's associated hash value. Although not shown in FIG. 9, the version number of the protocol (e.g., STT) may be incremented to indicate that the protocol can be used to store state relating to an elephant flow.

The receiver opportunistically tries to forward segments (i.e., packets) to the recipient in sequential order according the sequence number counter. The receiver of some embodiments maintains a buffer that holds segments that are greater than the counter ID the receiver expects. In some embodiments, the receiver immediately gives the recipient any contiguous block that it can that begins with the counter ID that the receiver expects. If after a relatively small delay, the receiver does not have the counter ID it expects, but has later ones, the receiver forwards what each packet the receiver has to the recipient. The receiver of some embodiments always sets the expected counter ID to the last counter it forwarded. If a segment for an elephant flow comes in with a lower ID than expected, the receiver of some embodiments always immediately forwarded to the recipient. Alternatively, the receiver can just drop the future segments (i.e., out of order segments) if it is concerned about introducing reordering.

Figure 10:
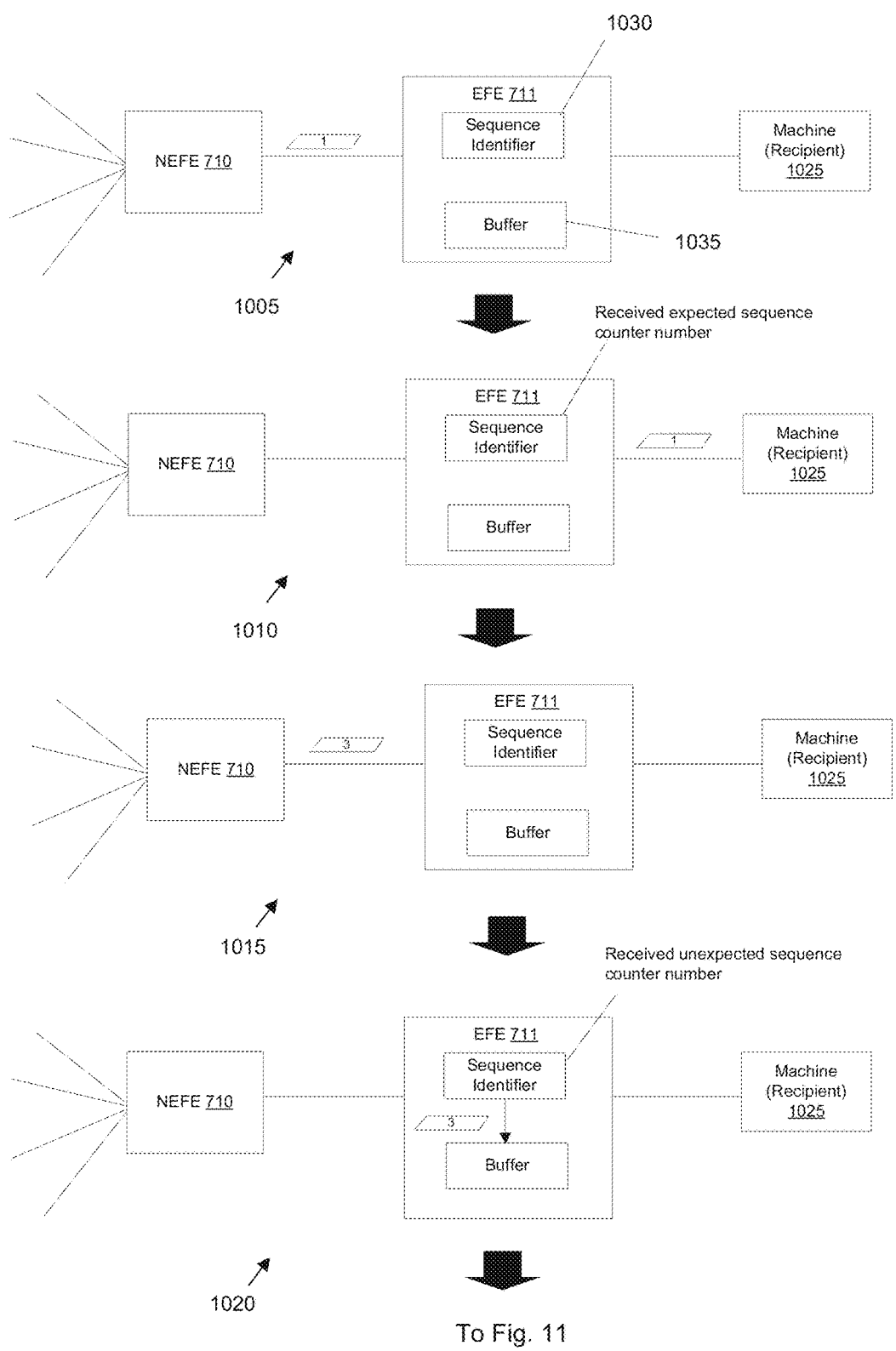
FIG. 10 illustrates an example of how a receiver uses a buffer to temporarily store packets that are received out of order.
Figure 11:
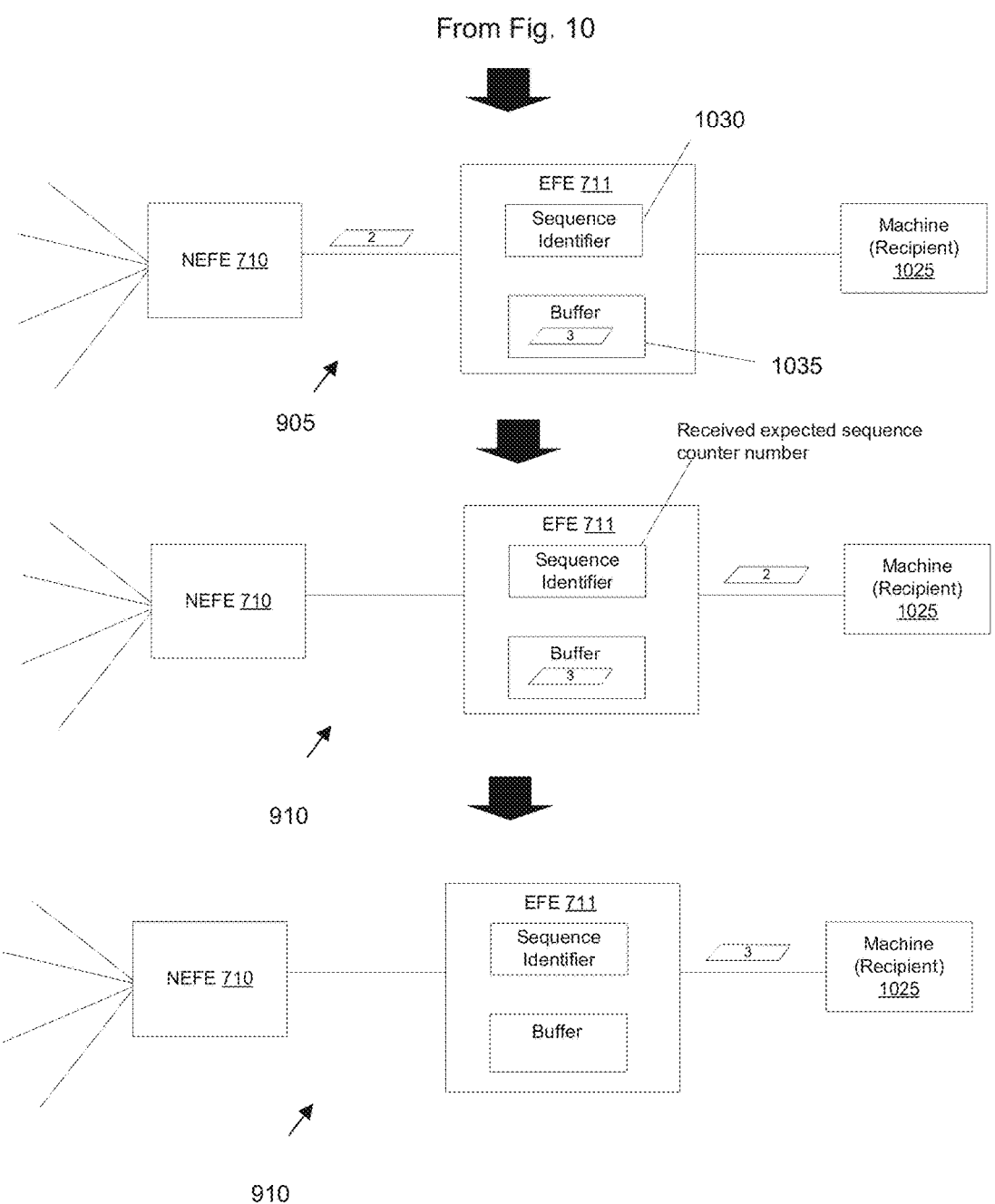
FIG. 11 illustrates an example of how one or more packets in the buffer is sent to a recipient.

FIGS. 10 and 11 illustrate an example of how the receiver uses a buffer to temporarily store packets that are received out of order. Specifically, FIG. 10 illustrates an example of how a receiver uses a buffer to temporarily store packets that are received out of order. FIG. 11 illustrates an example of how one or more packets in the buffer is sent to a recipient. In these figures, the receiver is the EFE 711 and the recipient is the machine 1025.

Four stages 1005-1020 are shown in FIG. 10. The EFE 710 also includes a sequence number identifier 1030 for identifying the elephant flow ID and the sequence number associated with each packet and a buffer 1025 to store packets that are received out of order.

The first stage 1005 shows the EFE 711 receiving the first packet from the NEFE 710. The first packet is received in order. Accordingly, in the second stage 1010, the EFE 711 forwards the first packet to the machine 1025. The third stage 1015 shows the EFE 711 receiving the third packet from the NEFE 710. The third packet is received out of sequence. Accordingly, in the fourth stage 1020, the EFE 711 stores the packet is the buffer 1025.

Three stages 1105-1115 are shown in FIG. 11. These stages 1105-1115 are a continuation of the ones shown in the previous figure. In the first stage 1105 of FIG. 11, the EFE 711 receiving the second packet from the NEFE 710. The second packet is received in out of order. Here, after a relatively small delay, the EFE 711 has received the second packet. Accordingly, in the second stage 1110, the EFE 711 sends the second packet to the machine 1025. The third stage 1110 then shows the EFE emptying the buffer and sending the third packet to the machine 1025.

In the example described above, the system introduces additional state into a particular protocol, such as STT, VXLAN, etc. An alternate approach to handling the reordering is to overload the TCP timestamp option, which the network interface controller or card (NIC) dutifully duplicates on transmit and receive for each fragment or each maximum transmission unit (MTU) sized packet. In the timestamp option, the system would encode a similar elephant flow ID and counter. The positive in this is that that the receiver can immediately flush its cache for that elephant flow if it knows that any earlier fragment is missing. One downside of this approach is some additional complexity and copying the elephant flow identifier (ID) and counter into each fragment.

D. Choosing Legs

In some embodiments, the forwarding element performs a traceroute to identify a network map and chooses different paths for packets associated with an elephant flow. For instance, the forwarding element of some embodiment determines one tunnel source port for each possible Layer 3 (L3) path, e.g. using a variant of the Paris traceroute algorithm. Once determined, the forwarding element (e.g., the forwarding element daemon) performs a precise mapping from flow to tunnel source port (e.g., in userspace). The forwarding element then would not have to perform the hashing of each flow to the whole set of source ports. Instead, the forwarding element specifies several distinct subsets of tunnel source ports, which would take distinct sets of L3 paths in the fabric. As an example, the forwarding element can specify for each flow the specific subset of source ports it could be hashed to. In this manner, the forwarding element ensures that elephant flows take different paths by hashing them to different sets of tunnel source ports.

Figure 12A:
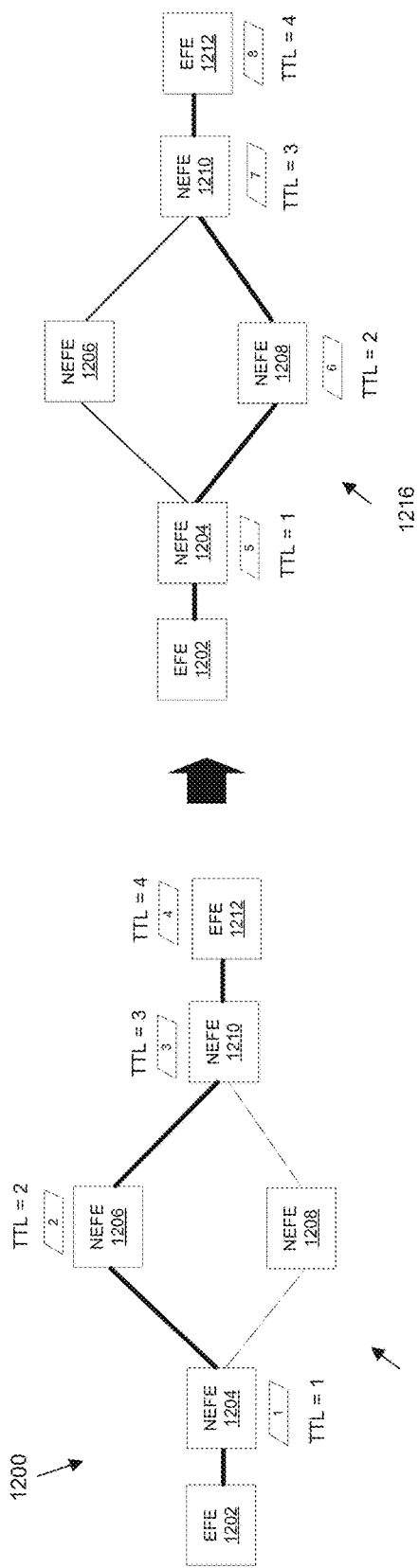
FIG. 12A shows an example of performing a traceroute to identify a network map.
Figure 12B:
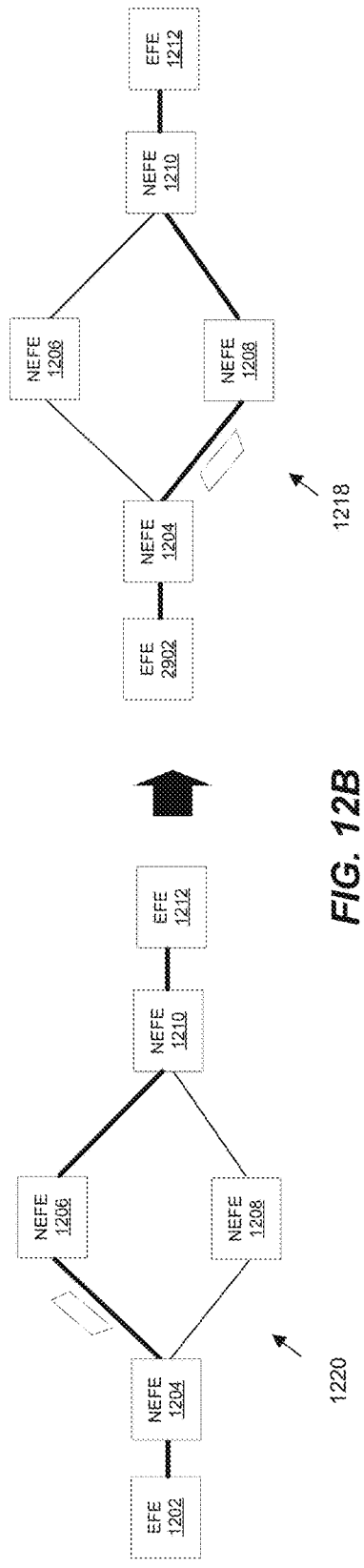
FIG. 12B illustrates an example of using the network map to choose different paths.

FIGS. 12A and 12B illustrate examples of (1) performing a traceroute operation to identify a network map and (2) forwarding packets along different chosen paths using the identified map. The figures show a network 1200 that includes several edge forwarding elements (EFEs) 1202 and 1212 and non-edge forwarding elements (NEFEs) 1204-1210.

FIG. 12A illustrates in two stages 1214 and 1216 how the EFE 1202 performs a traceroute to probe the network 1200 and identify a network map. In some embodiments, the EFE 1202 uses the Paris traceroute algorithm or a variation thereof to identify the network map. One reason for using such an algorithm is that typical traceroute algorithm can result in an inaccurate map of a network. This is especially true in cases where there is load balancing or multipathing in the network.

Two stages 1214 and 1216 are shown in FIG. 12. The first stage 1214 shows the EFE 1202 performing a traceroute to identify a first path in the network 1200. To map the path, the EFE 1202 sends a first packet (e.g., UDP or TCP packet) with a Time to Live (TTL) field set to one second to the NEFE 1204. The packet may be addressed to a particular network host (e.g., a destination machine). The NEFE 1204 receives the first packet then decrements the first packet's TTL value by one and returns a message (e.g., an Internet Control Message Protocol (ICMP) error message) which indicates that the specified time has been exceeded. The message includes information (e.g., an IP address) associated with the NEFE 1204. The EFE 1202 uses the information to identify the network map.

As shown in the first stage 1214, the EFE 1202 sends a second packet with the TTL field value incremented by one second to two seconds. The NEFE 1204 receives the second packet, decrements the second packet's TTL value by one second, and instead of returning an error message, forwards the second packet to the NEFE 1206. The NEFE 1206 receives the second packet and decrements the second packet's TTL and returns a message. The EFE 1202 then increments the time again and sends a third packet to identify the NEFE 1210. Lastly, the EFE 1204 sends the fourth packet with the TTL time incremented to identify the EFE 1212.

The second stage 1216 shows the EFE 1202 performing a traceroute to identify a second path in the network 1200. Here, the EFE 1202 performs similar probes as the first stage 1214. However, the NEFE 1204 sends each packet that it receives along the second path to the NEFE 1208. Here, the EFE 1202 might have randomize the source port value to a different value than the first stage 1214. In this way, the traceroute can map out the second available paths. In some embodiments, the EFE 1202 uses a same flow identifier for each path and maps one path at a time, as illustrated in FIG. 12A.

In some embodiments, Paris traceroute controls the probe header fields to allow all probes towards a destination to follow the same path in the presence of per-flow load balancing. Paris traceroute does this by varying header fields that are within the first 28 octets, but are not used for load balancing. For instance in TCP probes, Paris traceroute varies the sequence number. In UDP probes, it is the checksum field. This may require the manipulation of the payload to yield the desired checksum. In addition, for (Internet Control Message Protocol) ICMP probes, the algorithm may use a combination of the ICMP identifier and the sequence number. Paris traceroute sets the value of the ICMP identifier and sequence number to keep constant the header checksum of all probes to a destination.

FIG. 12B shows the EFE 1202 forwarding several packets associated with an elephant flow. Specifically, the figure shows in two stages 1218 and 1220 how the EFE 1202 uses the identified map to send the packets along the two different paths. In the first stage 1218, the EFE 1218 chooses the first path by assigning one value (e.g., hash value) for the source port for the packet's outer header. In the second stage 1205, the EFE 1202 chooses the second path by using another value for the source port for the packet's outer header.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 13:
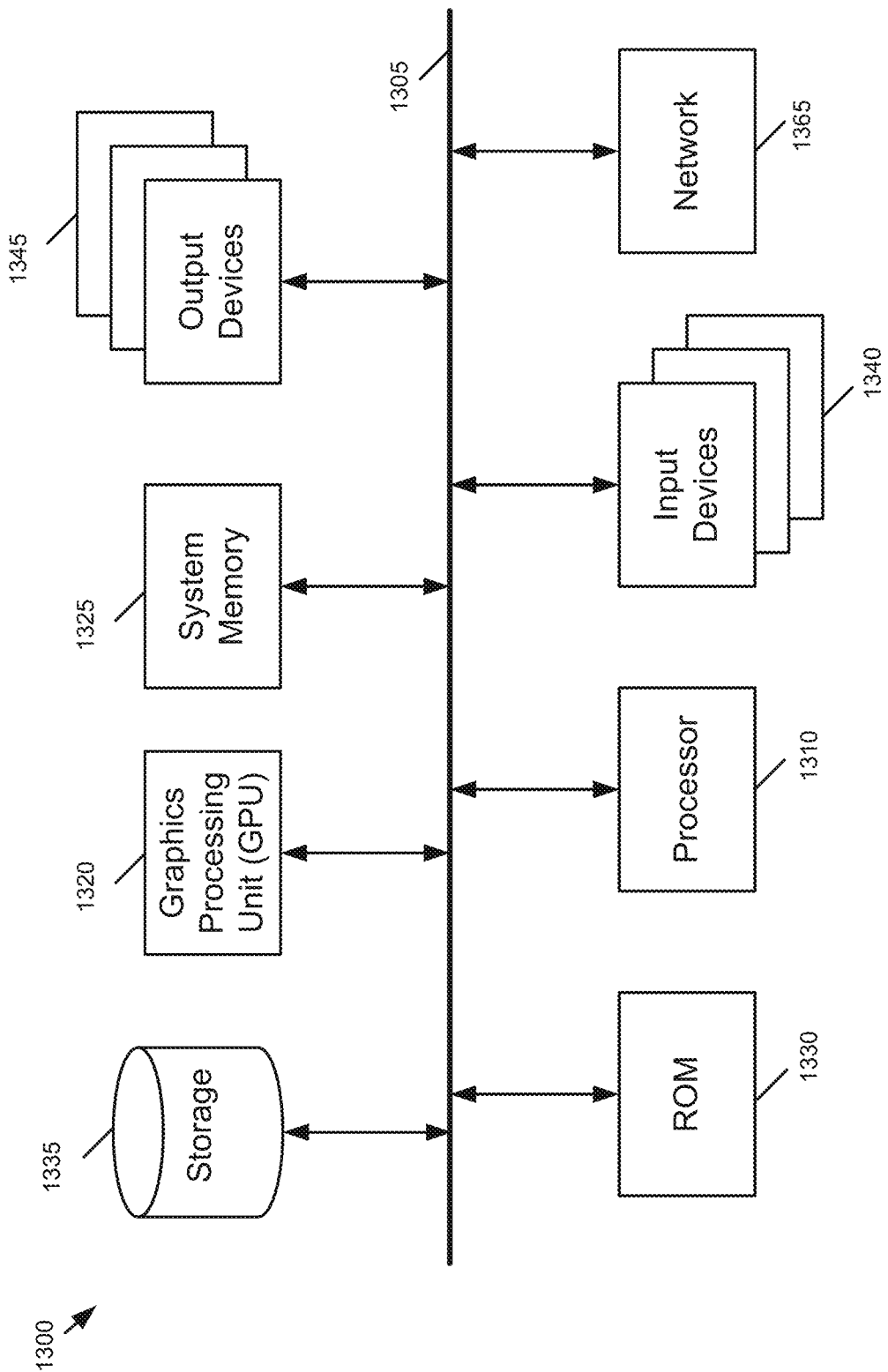
FIG. 13 conceptually illustrates an electronic system with which some embodiments of the invention are implemented.

FIG. 13 conceptually illustrates an electronic system 1300 with which some embodiments of the invention are implemented. The electronic system 1300 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the system memory 1325, and the permanent storage device 1335.

From these various memory units, the processing unit(s) 1310 retrieves instructions to execute and data to process in order to execute the processes of the invention. The processing unit(s) may be a single processor or a multi-core processor in different embodiments.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1335.

Other embodiments use a removable storage device (such as a floppy disk, flash memory device, etc., and its corresponding drive) as the permanent storage device. Like the permanent storage device 1335, the system memory 1325 is a read-and-write memory device. However, unlike storage device 1335, the system memory 1325 is a volatile read-and-write memory, such a random access memory. The system memory 1325 stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieves instructions to execute and data to process in order to execute the processes of some embodiments.

The bus 1305 also connects to the input and output devices 1340 and 1345. The input devices 1340 enable the user to communicate information and select commands to the electronic system. The input devices 1340 include alpha-numeric keyboards and pointing devices (also called "cursor control devices"), cameras (e.g., webcams), microphones or similar devices for receiving voice commands, etc. The output devices 1345 display images generated by the electronic system or otherwise output data. The output devices 1345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 13, bus 1305 also couples electronic system 1300 to a network 1365 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 1, 4, and 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A non-transitory machine readable medium that stores a program which when executed by at least one processing unit implements a forwarding element, the program comprising sets of instructions for:
   monitoring data flows associated with a network host to detect an elephant flow for which the forwarding element processes a plurality of packets, wherein the forwarding element encapsulates the packets of the elephant flow with an outer header; and
   for at least two packets of the elephant flow, differentiating the two packets by (i) encapsulating a first packet of the elephant flow using a first header field value for a particular header field of the outer header and (ii) encapsulating a second packet of the elephant flow using a second header field value for the particular header field of the outer header,
   wherein the different header field values for the particular header field break the elephant flow into at least two different mouse flows such that subsequent forwarding elements, to which the packets are sent from the forwarding element, send the packets of the detected elephant flow along different paths to reach a same destination.

2. The non-transitory machine readable medium of claim 1, wherein the program further comprises a set of instructions for forwarding the packets in the elephant flow to a multipathing hardware, wherein the header field is a source port field and the first and second header values are different first and second port numbers, wherein the first and second port numbers are translated by the multipathing hardware to send the packets along different paths.

3. The non-transitory machine readable medium of claim 1, wherein the different paths are equal-cost multi-path routing (ECMP) legs.

4. The non-transitory machine readable medium of claim 1, wherein the set of instructions for differentiating the two packets by encapsulating a first packet using a first header value and a second packet using a second header value comprises sets of instructions for:
   performing a traceroute operation to identify a network map; and
   identifying the first and second header values based on the network map, wherein the first and second header values are associated with different paths of the network map.

5. The non-transitory machine readable medium of claim 4, wherein the traceroute operation is a Paris traceroute operation.

6. The non-transitory machine readable medium of claim 1, wherein the program further comprises a set of instructions for marking each packet in the detected elephant flow with a sequence number to deliver the packet in the order that the packet was received.

7. The non-transitory machine readable medium of claim 6, wherein the program further comprises a set of instructions for marking each packet with an identifier to identify the detected elephant flow.

8. A host machine comprising:
   a set of processing units; and
   a set of non-transitory machine readable media that store, for execution by the set of processing units:
      at least one virtual machine (VM); and
      an edge forwarding element for monitoring data flows associated with the VM to detect elephant flows, wherein the monitoring comprises:
         tracking a data flow by maintaining a statistic relating to the data flow;

determining whether the statistic is over a threshold value;

categorizing the data flow as an elephant flow when the statistic is over the threshold value generating a first set of header values for a first encapsulation header to append to a first set of packets in the elephant flow; and generating a second, different set of header values for a second encapsulation header to append to a second set of packets in the elephant flow, wherein the different header values of the encapsulation headers break the elephant flow into a first mouse flow and a second mouse flow such that subsequent forwarding elements send the first and second sets of packets along different paths.

9. The host machine of claim 8, wherein the edge forwarding element updates the statistic relating to the data flow by monitoring at least one of (i) a set of packets sent from the VM and (ii) a set of packets sent to the VM.

10. The host machine of claim 8, wherein a flow entry in a flow table is used to process the packets in the data flow and the statistic is a statistic of the flow entry, wherein the monitoring further comprises updating the statistic of the flow entry each time the flow entry is used to forward a packet.

11. The host machine of claim 8, wherein the statistic is a byte count, wherein the determining comprises comparing the byte count with the threshold value to determine whether the byte count is over the threshold value.

12. The host machine of claim 8, wherein the statistic is a data transfer rate, wherein the determining comprises comparing the data transfer rate with the threshold value to determine whether the data transfer rate is over the threshold value.

13. The host machine of claim 8, wherein the categorizing comprises identifying information to report to the network controller regarding the elephant flow.

14. The host machine of claim 13, wherein the information includes at least one of tunnel information, an ingress port, a source transport layer protocol port number, a destination transport layer port number, an Ethernet type, a source Ethernet address, a destination Ethernet address, a source IP address, and a destination IP address.

15. A method of handling an elephant flow, the method comprising:

detecting that a data flow associated with a network host is an elephant flow, wherein the packets of the elephant flow are encapsulated with an outer header;

for at least two packets of the elephant flow, differentiating the two packets by (i) encapsulating a first packet of the elephant flow using a first header field value for a particular header field of the outer header and (ii) encapsulating a second packet of the elephant flow using a second header field value for the particular header field of the outer header, wherein the different header field values for the particular header field break the elephant flow into at least two different mouse flows; and forwarding the packets of the detected elephant flow to a forwarding element, wherein the forwarding element sends the packets along different paths, based on the first and second header values for the header field, to reach a same destination.

16. The method of claim 15 further comprising marking each packet of the mouse flows with an indicator that associates the packet with the elephant flow, wherein the indicator is a third header field value in a second header field of the outer header that indicates that the packet belongs to the elephant flow.

17. The method of claim 16, wherein the third header field value is a DSCP (Differentiated Service Code Point) value in the second header field of the outer header.

18. The method of claim 15, wherein the method is performed by an edge forwarding element, and the forwarding element to which each packet is sent is a non-edge forwarding element.

19. The method of claim 18, wherein the edge forwarding element is a software forwarding element that operates on a computing device, and the non-edge forwarding element is a hardware forwarding element that has hardware designed to support hardware forwarding.

20. The method of claim 15, wherein the different paths are equal-cost multi-path routing (ECMP) legs.

* * * * *